(12) United States Patent
Arakawa

(10) Patent No.: US 7,889,920 B2
(45) Date of Patent: Feb. 15, 2011

(54) IMAGE PROCESSING FOR COPY-FORGERY-INHIBITED PATTERN IMAGE DATA

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 11/764,275

(22) Filed: Jun. 18, 2007

(65) Prior Publication Data
US 2008/0019590 A1 Jan. 24, 2008

(30) Foreign Application Priority Data
Jul. 18, 2006 (JP) ............................. 2006-196279

(51) Int. Cl.
*G06K 9/36* (2006.01)
*G06K 9/34* (2006.01)
(52) U.S. Cl. ....................................... 382/166; 382/173
(58) Field of Classification Search .................. 382/166
See application file for complete search history.

(56) References Cited

U.S. PATENT DOCUMENTS

| | | | | |
|---|---|---|---|---|
| 6,594,385 B2 * | 7/2003 | Grohs et al. | ................ | 382/166 |
| 6,865,291 B1 * | 3/2005 | Zador | .......................... | 382/166 |
| 6,944,357 B2 * | 9/2005 | Bossut et al. | ................ | 382/298 |
| 7,057,772 B1 * | 6/2006 | Bannai | ....................... | 358/3.01 |
| 2005/0280841 A1 * | 12/2005 | Bossut et al. | ................. | 358/1.2 |
| 2006/0274939 A1 * | 12/2006 | Yamada | ...................... | 382/173 |
| 2007/0206852 A1 * | 9/2007 | McGee | ......................... | 382/166 |

FOREIGN PATENT DOCUMENTS

| | | |
|---|---|---|
| JP | 2001-197297 | 7/2001 |
| JP | 2006-191365 | 7/2006 |
| JP | 2007-68049 | 3/2007 |

* cited by examiner

*Primary Examiner*—David P Rashid
(74) *Attorney, Agent, or Firm*—Fitzpatrick, Cella, Harper & Scinto

(57) ABSTRACT

According to the claimed invention, an image processing apparatus is provided, wherein the image processing apparatus comprises a color determiner, adapted to determine a color of image data; a color space determiner, adapted to determine a color space for compressing the image data based on the color determined by the color determiner; and a converter, adapted to convert the image data into data on a plurality of planes that constitute the color space determined by the color space determiner and compressing the data on each plane, wherein the color space determiner determines the color space based on the color determined by the color determiner so that AC components of the image data concentrate on a certain plane of the plurality of planes.

5 Claims, 19 Drawing Sheets

FIG. 9

$$T1 = \begin{pmatrix} 2, & 2, & 2, & 2, & 3, & 5, & 6, & 7 \\ 2, & 2, & 2, & 2, & 3, & 6, & 7, & 6 \\ 2, & 2, & 2, & 3, & 5, & 6, & 7, & 6 \\ 2, & 2, & 3, & 3, & 6, & 9, & 9, & 7 \\ 2, & 3, & 4, & 6, & 7, & 11, & 11, & 8 \\ 3, & 4, & 6, & 7, & 9, & 11, & 12, & 10 \\ 5, & 7, & 8, & 9, & 11, & 13, & 13, & 11 \\ 8, & 10, & 10, & 10, & 12, & 12, & 11, & 10 \end{pmatrix}$$

$$T2 = \begin{pmatrix} 7, & 5, & 5, & 7, & 10, & 17, & 21, & 25 \\ 5, & 5, & 6, & 8, & 11, & 24, & 25, & 23 \\ 6, & 6, & 7, & 10, & 17, & 23, & 28, & 23 \\ 6, & 7, & 9, & 12, & 21, & 35, & 33, & 25 \\ 8, & 9, & 15, & 23, & 28, & 44, & 42, & 31 \\ 10, & 15, & 23, & 26, & 33, & 42, & 46, & 37 \\ 20, & 26, & 32, & 35, & 42, & 49, & 49, & 41 \\ 29, & 37, & 39, & 40, & 45, & 45, & 42, & 40 \end{pmatrix}$$

.
.
.

$$Tn = \begin{pmatrix} 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \\ 246, & 255, & 255, & 255, & 255, & 255, & 255, & 255, \\ 255, & 255, & 255, & 255, & 255, & 255, & 255, & 255, \end{pmatrix}$$

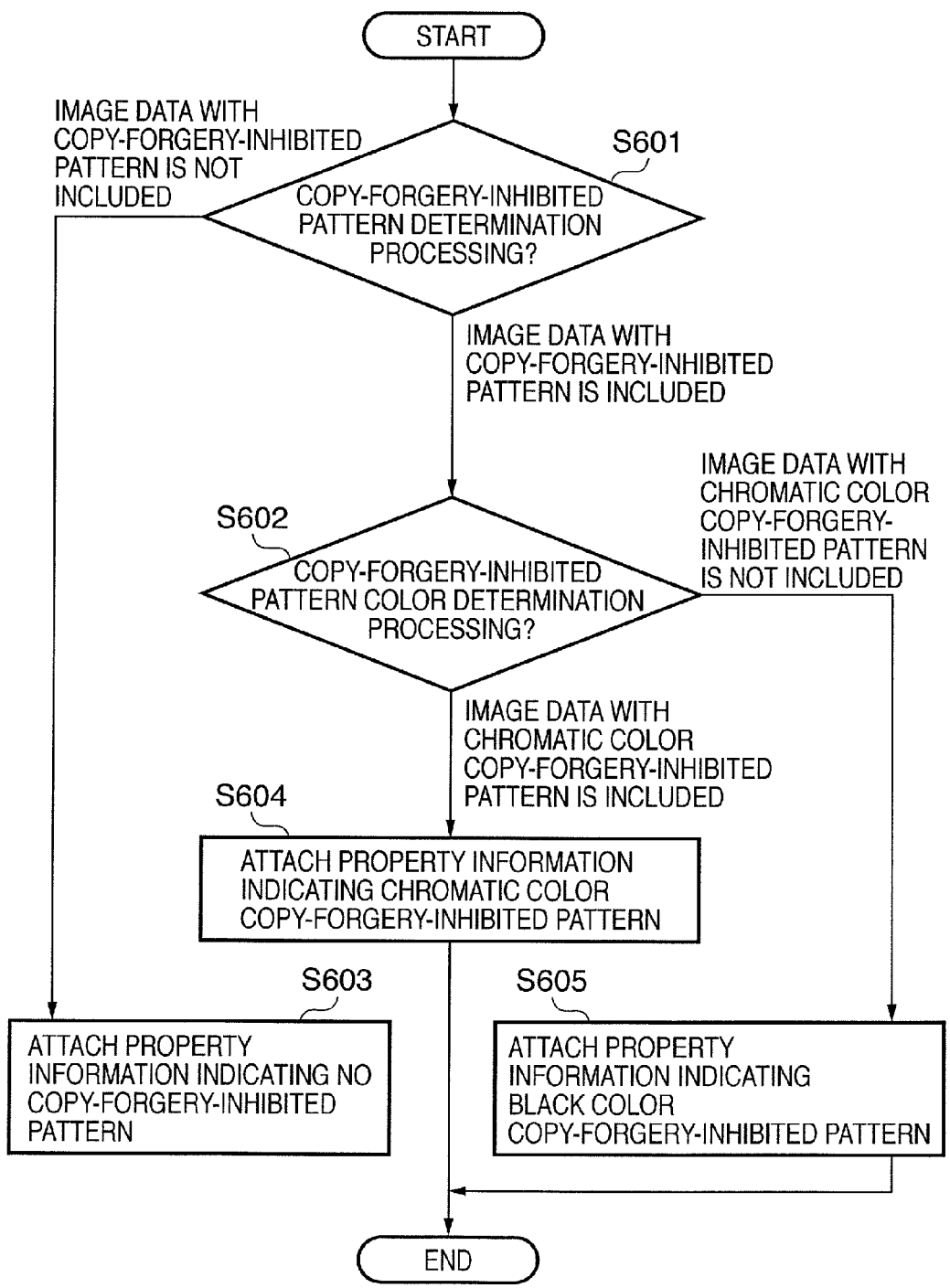

F I G. 14A
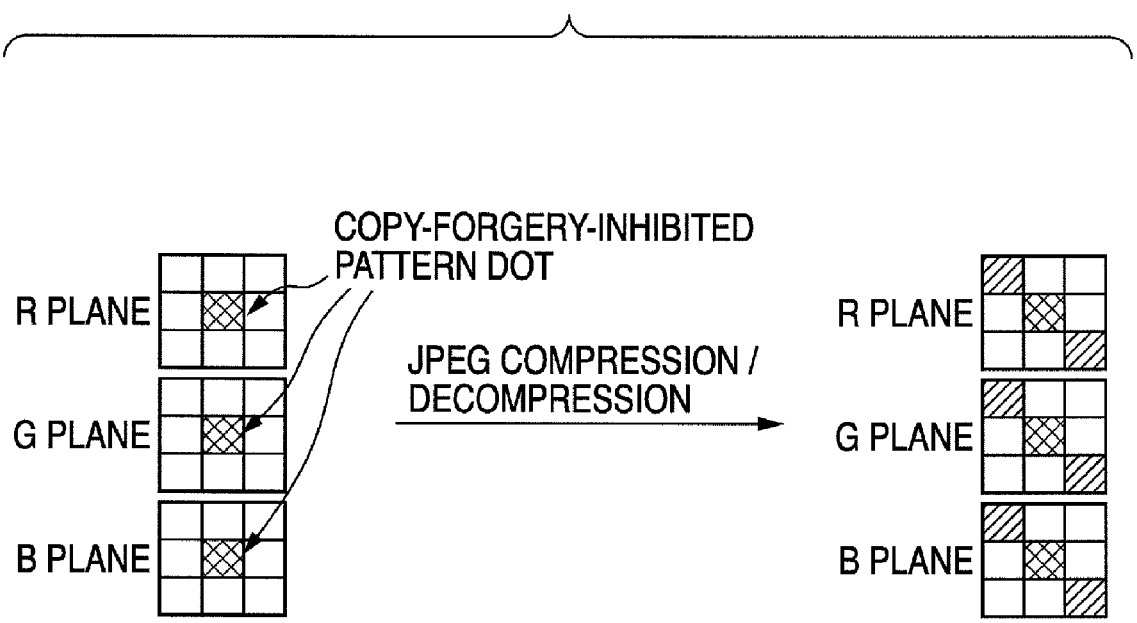

F I G. 15
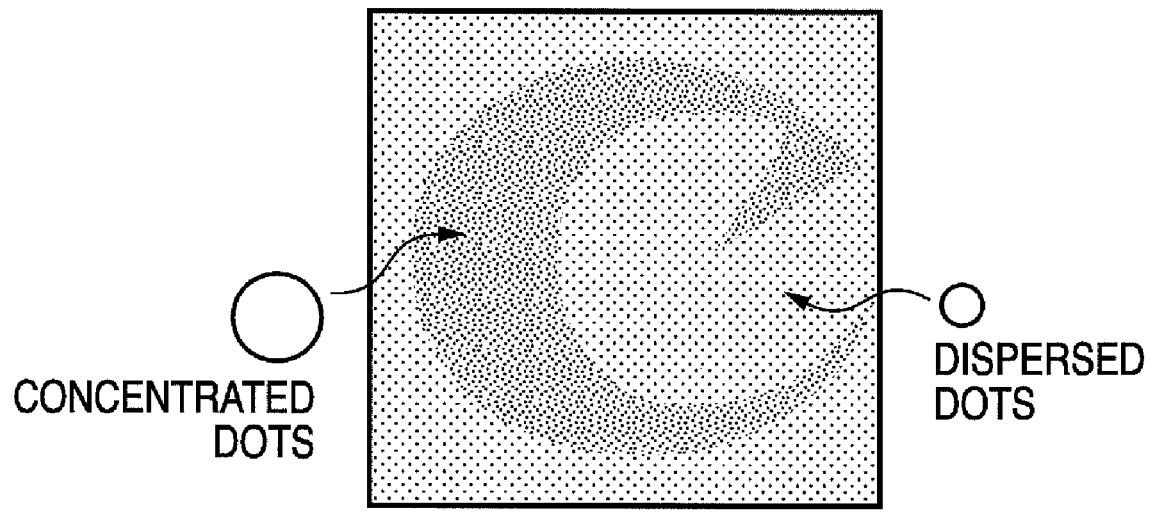

FIG. 16
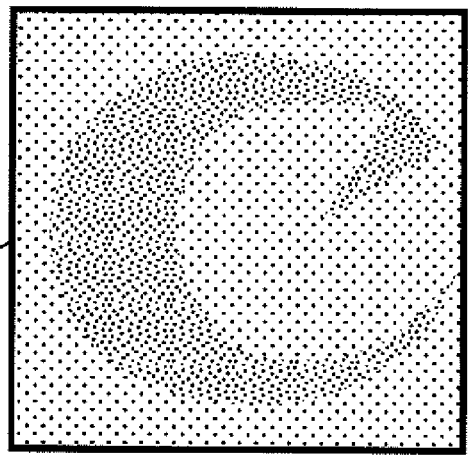
1601
IMAGE VISUALIZATION
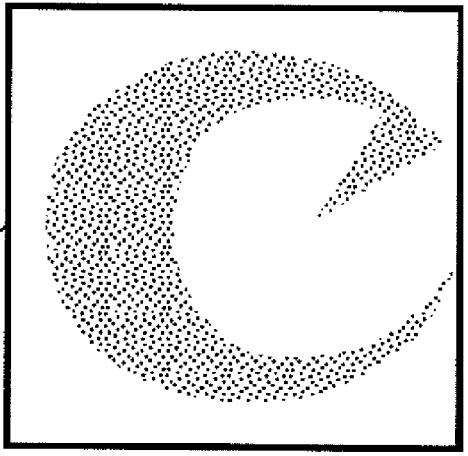
1602

FIG. 17

|  | BLACK COLOR COPY-FORGERY-INHIBITED PATTERN IMAGE DATA | CHROMATIC COLOR COPY-FORGERY-INHIBITED PATTERN IMAGE DATA |
|---|---|---|
| JPEG COMPRESSION IN RGB SPACE | (POOR) NOT MUCH REDUCTION IN DATA SIZE <br> (GOOD) NO HUE CHANGE | (GOOD) MUCH REDUCTION IN DATA SIZE <br> (GOOD) NO HUE CHANGE |
| JPEG COMPRESSION IN YCbCr SPACE | (GOOD) MUCH REDUCTION IN DATA SIZE <br> (GOOD) NO HUE CHANGE | (POOR) NOT MUCH REDUCTION IN DATA SIZE <br> (POOR) SIGNIFICANT HUE CHANGE |

IMAGE PROCESSING FOR COPY-FORGERY-INHIBITED PATTERN IMAGE DATA

BACKGROUND OF THE INVENTION

1. Field of the Invention

The present invention relates to image processing apparatuses, image processing apparatuses and information processing apparatuses, and information processing methods. More particularly, the present invention relates to an image processing apparatus with an image data encoding function, the image processing apparatus and an information processing apparatus, and an information processing method.

2. Description of the Related Art

Japanese Patent Laid-Open No. 2001-197297 discloses a technique by which a computer transmits document data and copy-forgery-inhibited pattern image data to a printer, which combines the received two image data items and outputs the resulting combined image data (document data with a background pattern) onto plain paper to create an original. The copy-forgery-inhibited pattern image has a character string or the like embedded therein. Therefore, on a copy obtained by copying the image with the background pattern, the embedded character string emerges as in the case where security paper is used.

This copy-forgery-inhibited pattern image consists of an area that "remains" on the copy and an area that "disappears" (or becomes fainter than the area that remains) on the copy. Since the reflection density in these two areas is almost the same on the original, human eyes cannot recognize that the character string such as "COPY" is embedded therein. Here, "remain" means that an image on the original is exactly reproduced on the copy, and "disappear" means that an image on the original is not reproduced on the copy. The reflection density is measured with a reflection densitometer.

Hereinafter, the area that "remains" on the copy will be referred to as a "latent image part", and the area that "disappears" (or becomes fainter than the area that remains) on the copy will be referred to as a "background part."

FIG. 15 is a diagram showing an exemplary state of dots in copy-forgery-inhibited pattern image data. In FIG. 15, an area in which large dots are disposed at a low density (in smaller numbers) is the latent image part, and an area in which small dots are disposed at a high density (in larger numbers) is the background part. An image in the latent image part is called a latent image, and an image in the background part is called a background image. The area of dots per unit area is almost the same in both parts.

A small dot is about 42 μm×42 μm (1 pixel of 600 dpi), and a large dot is about 126 μm×126 μm (9 pixels of 600 dpi). A large dot in the latent image part is larger than a minimum dot reproducible by a copier, and a small dot in the background part is smaller than the minimum dot reproducible by a copier. Therefore, only the large dots in the latent image part are reproduced on a copy. As a result, the image in the latent image part is reproduced to be darker than the image in the background part on the copy. The phenomenon in which an embedded image such as a character string appears emerging because of the latent image part being reproduced to be darker than the background part on a copy will hereinafter be referred to as image visualization.

FIG. 16 is a diagram showing this image visualization. FIG. 16 shows a copy-forgery-inhibited pattern image 1601 and a copy 1602. In the copy-forgery-inhibited pattern image 1601, large dots represent dots in the latent image part, and small dots represent dots in the background part. Copying a sheet on which the copy-forgery-inhibited pattern image 1601 is formed results in the copy 1602. It will be seen from the copy 1602 that the small dots in the copy-forgery-inhibited pattern image 1601 are so small that they are not reproduced on the copy.

Copy-forgery-inhibited pattern images include chromatic color copy-forgery-inhibited pattern images and achromatic color copy-forgery-inhibited pattern images. For example, copy-forgery-inhibited pattern images generated by a printer with CMYK color materials (ink or toner) attached thereto include a yellow color copy-forgery-inhibited pattern image, a cyan color copy-forgery-inhibited pattern image, and a magenta color copy-forgery-inhibited pattern image, as well as a black color copy-forgery-inhibited pattern image. The first three are chromatic color copy-forgery-inhibited pattern images, and the last one is an achromatic color copy-forgery-inhibited pattern image. In any case, a copy-forgery-inhibited pattern image is often recorded on a sheet with a color material of a single color.

In RGB, white is represented as (R, G, B)=(255, 255, 255) and black is represented as (R, G, B)=(0, 0, 0). A black color copy-forgery-inhibited pattern image is represented by repetition of a white background and a black dot. Therefore, a black color copy-forgery-inhibited pattern image data is represented by repetition of a white (255, 255, 255) pixel and a black (0, 0, 0) pixel.

Further, a cyan color copy-forgery-inhibited pattern image has cyan dots disposed on a white background. Therefore, a cyan color copy-forgery-inhibited pattern image data is represented by repetition of a white (255, 255, 255) pixel and a cyan (0, 255, 255) pixel.

Since the data size of image data in print data transmitted from a host computer is very large, a problem arises when a printer prints the print data. That is, the image data would consume a significant amount of memory in the printer, thereby causing the printer to delay execution of other processing (e.g., copying, transmission, etc.).

To prevent this delay in the execution of other processing, printers implement compression techniques. Many of the products implement the JPEG compression technique among others. Herein, JPEG compression may be referred to as encoding, and decompression may be referred to as decoding. However, Huffman coding means exactly Huffman coding and does not mean JPEG compression. Since JPEG compression is used in an irreversible mode in embodiments herein, JPEG compression may also be referred to as irreversible compression.

JPEG compression is a technique that involves subjecting image data to DCT (Discrete Cosine Transformation) to obtain DCT coefficients, quantizing the DCT coefficients by using a quantization table, and further subjecting the quantized DCT coefficients to Huffman coding processing by zigzag-scanning them. Thus, JPEG compression is a technique of reducing the data size of image data by quantization and Huffman coding processing.

The DCT coefficients are also called DCT components. The DCT components consist of a DC component (a no-frequency component) and AC components (frequency components). The AC components (the frequency components), of course, include low-frequency components and high-frequency components. Generally, the quantization table preferentially deletes high-frequency components.

While there are printers that JPEG-compress RGB image data, there are also printers that convert RGB image data into YCbCr image data and then JPEG-compress the converted YCbCr image data.

A printer that JPEG-compresses YCbCr image data uses the following formulas to convert RGB image data into YCbCr image data, and then JPEG-compresses the image data. It is assumed that each component in both RGB and YCbCr color spaces ranges from 0 to 255.

$$Y=0.2990R+0.5870G+0.1140B$$

$$Cb=-0.1687R-0.3313G+0.5000B+128$$

$$Cr=0.5000R-0.4187G-0.0813B+128$$

Reverse conversion is as follows.

$$R=Y+1.40200(Cr-128)$$

$$G=Y-0.34414(Cb-128)-0.71414(Cr-128)$$

$$B=Y-1.77299(Cb-128)$$

When achromatic color copy-forgery-inhibited pattern image data is input to a printer that JPEG-compresses RGB image data in the RGB color space, a problem arises that the data size after JPEG compression is still large. This problem will be described in the following paragraph.

Since black color copy-forgery-inhibited pattern image data is represented by repetition of a white (255, 255, 255) pixel and a black (0, 0, 0) pixel, a large value (255) and a small value (0) repeatedly appear with great frequency on all of the R, G, and B planes. Therefore, frequency components (also called alternating-current components or AC components) are very large on the planes of all colors (on all color planes). JPEG compression of image data having large frequency components (AC components) on all planes naturally results in a substantially large data size even after compression.

On the other hand, when chromatic color copy-forgery-inhibited pattern image data is input to the aforementioned printer that converts RGB image data into YCbCr image data and JPEG-compresses the converted YCbCr image data, a problem arises that the data size after JPEG compression is still large. This problem will be described in the following paragraph by using a cyan color copy-forgery-inhibited pattern image data as an example.

A cyan color copy-forgery-inhibited pattern image data is represented by repetition of a cyan (0, 255, 255) pixel and a white (255, 255, 255) pixel. When these pixels are converted into the YCbCr space, white is represented as (Y, Cb, Cr)= (255, 128, 128) and cyan is represented as (Y, Cb, Cr)=(179, 171, 0).

On each of the Y, Cb, and Cr planes, a rather large value and a rather small value repeatedly appear with great frequency. Therefore, frequency components (AC components) are rather large on all planes. JPEG compression of image data having large frequency components (AC components) on all planes naturally results in a substantially large data size even after compression.

Thus, when a conventional printer JPEG-compresses copy-forgery-inhibited pattern image data of particular colors, the data size after JPEG compression is still large.

Of course, in either case, image data could be JPEG-compressed by using a quantization table for a high compression rate if what is aimed for were only to drastically reduce the data size after JPEG compression. However, the use of a quantization table for a high compression rate significantly degrades the image quality of the image data.

SUMMARY OF THE INVENTION

The present invention has been made in the light of the above conventional practice. It is an object of the present invention to provide an image processing apparatus, the image processing apparatus and an information processing apparatus, and an information processing method that are capable of reducing the data size of copy-forgery-inhibited pattern image data after compression while reducing the degree of degradation of the image quality of the copy-forgery-inhibited pattern image data after compression and decompression.

To solve the above-described problems, the image processing apparatus according to the present invention includes:
a color determiner, adapted to determine a color of image data;
a color space determiner, adapted to determine a color space for compressing the image data based on the color determined by the color determination means; and
a converter, adapted to convert the image data into data on a plurality of planes that constitute the color space determined by the color space determiner and compressing the data on each plane,
wherein the color space determiner determines the color space based on the color determined by the color determiner so that AC components of the image data concentrate on a certain plane of the plurality of planes.

The present invention can provide an image processing apparatus, an image processing apparatus and an information processing apparatus, and an information processing method that are capable of reducing the data size of copy-forgery-inhibited pattern image data after compression while reducing the degree of degradation of the image quality of the copy-forgery-inhibited pattern image data after compression and decompression.

Further features of the present invention will become apparent from the following description of exemplary embodiments (with reference to the attached drawings).

BRIEF DESCRIPTION OF THE DRAWINGS

FIG. 9 is a diagram showing exemplary quantization tables used for encoding in the image processing apparatus according to the embodiments of the present invention;

FIG. 13 is a flowchart for adding copy-forgery-inhibited pattern property information to image data property information for print data items integrated in the computer according to the second embodiment of the present invention;

FIG. 14A is a conceptual view showing an effect of the second embodiment of the present invention;

FIG. 15 is a diagram showing an exemplary generated copy-forgery-inhibited pattern image data subjected to processing up to boundary processing;

FIG. 16 is a diagram showing the state of dots in the copy-forgery-inhibited pattern image data; and FIG. 17 is a diagram of a table summarizing the cases where copy-forgery-inhibited pattern image data of certain colors is JPEG-compressed in the RGB color space and the YCbCr color space respectively.

DESCRIPTION OF THE EMBODIMENTS

First Embodiment

<Operational Principle of the Invention>

The principle of the present invention will be described with reference to FIGS. 1 and 2.

Figure 2:
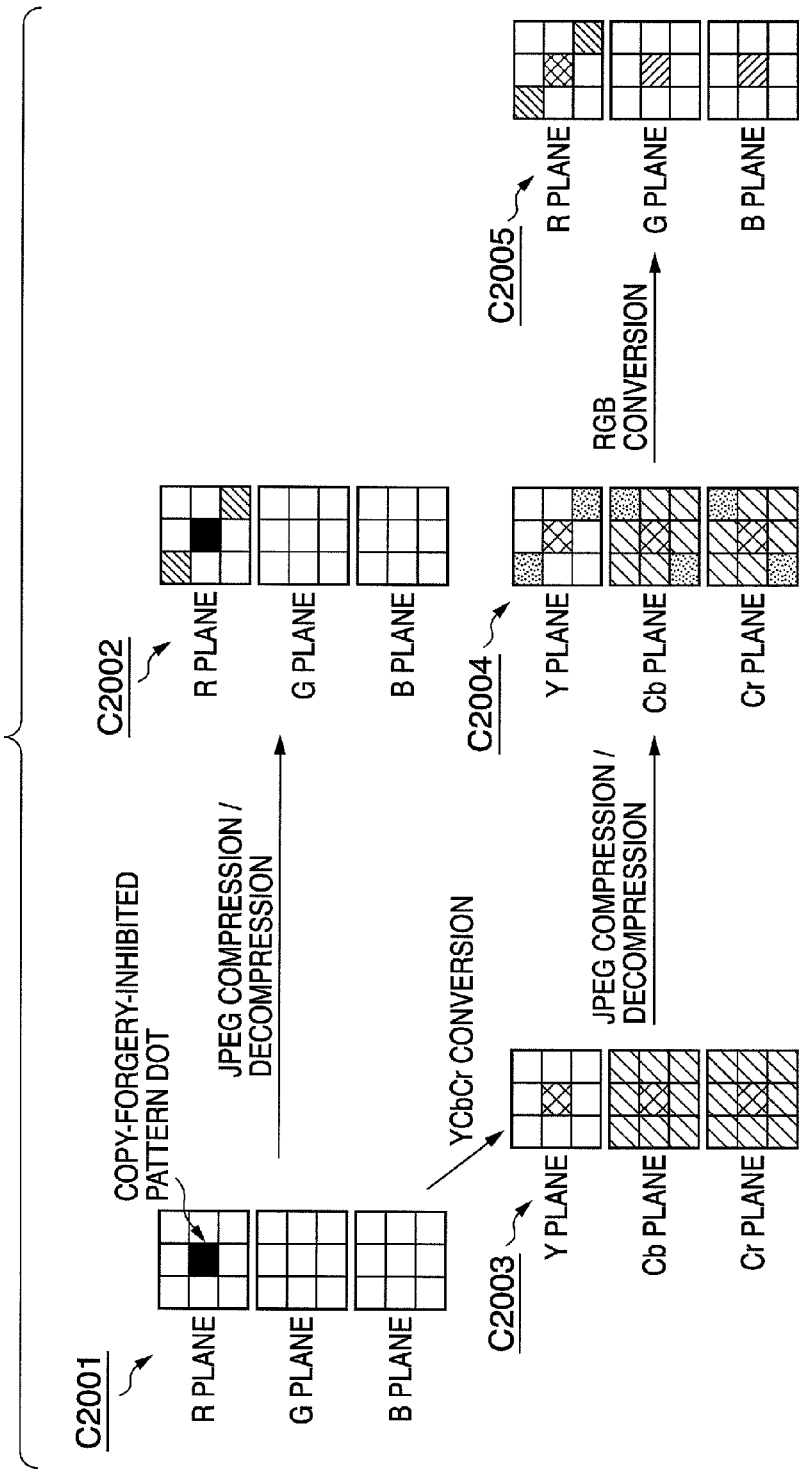
FIG. 2 is a conceptual view showing the relationship between a chromatic color copy-forgery-inhibited pattern and JPEG compression.

Reference numeral C2001 in FIG. 2 denotes a small dot (in the background area) in cyan color copy-forgery-inhibited pattern image data. Pixels filled in with white indicate the luminance value 255, while a pixel filled in with black indicates the luminance value 0. Since the pixels filled in with white on all the R, G, and B planes have the luminance value 255 for all the R, G, and B, they are white pixels.

On the other hand, since the pixel filled in with black only on the R plane and with white on the G and B planes has (R, G, B)=(0, 255, 255), it is a cyan pixel.

<JPEG Compression of Cyan Color Copy-Forgery-Inhibited Pattern Image Data After Conversion from RGB Space into YCbCr Space>

Converting this small dot C2001 in the cyan color copy-forgery-inhibited pattern image data into the YCbCr color space results in C2003. The pixel that was cyan in C2001 has (Y, Cb, Cr)=(179, 171, 0) in C2003. The pixels that were white in C2001 have (Y, Cb, Cr)=(255, 128, 128) in C2003. That is, the copy-forgery-inhibited pattern image data converted into the YCbCr color space has a larger value and a smaller value on all the Y, Cb, and Cr planes. Specifically, Y has the values 179 and 255, Cb has the values 171 and 128, and Cr has the values 0 and 128.

Thus, a cyan color copy-forgery-inhibited pattern image data converted into the YCbCr color space has both of pixels having a larger value and pixels having a smaller value on all planes. If such an image having large frequency components (AC components) on all planes is JPEG-compressed, the data size of the JPEG-compressed image data will not be much reduced (the image will not be compressed well).

Furthermore, the small dot that would be recorded with only a cyan color material will be recorded with various color materials. The reason for this problem will be described below.

JPEG-compressing and decompressing C2003 having the cyan pixel (Y, Cb, Cr)=(179, 171, 0) and the white pixels (Y, Cb, Cr)=(255, 128, 128) results in C2004. Since JPEG compression has quantized mainly high-frequency components, each plane of C2004 has data that is softer (less sharp) than data on each plane of C2003. That is, data with fewer high-frequency components (C2004) is obtained.

C2005 further shows RGB image data obtained by converting this YCbCr data of C2004 into RGB. In C2005, it can be seen that intermediate values (values that are between 0 and 255 but neither 0 nor 255) occur on each of the planes R, G, and B. That is, while C2001 shows the small dot to be recorded with only a cyan color material, C2005 shows data to be recorded with various color materials such as cyan, magenta, and yellow.

To summarize the above problems, JPEG compression of chromatic (cyan) color copy-forgery-inhibited pattern image data after being converted from the RGB space into the YCbCr space causes the following problems when the data is decompressed and returned to the RGB space. First, the data size is not reduced. Second, the color is different from the original color; the color to be produced with only a cyan material is made into a color to be produced with various color materials.

<JPEG Compression of Cyan Color Copy-Forgery-Inhibited Pattern Image Data in RGB Space>

Next, consideration will be given to JPEG compression of the cyan color copy-forgery-inhibited pattern image data without conversion from the RGB color space. In the RGB color space, the background of the dot is white (255, 255, 255) and the dot itself is cyan (0, 255, 255).

In the image data C2001 of FIG. 2, the G and B planes contain only no-frequency components (DC components) (each plane entirely has 255). Therefore, for the G and B planes, JPEG compression of the image data C2001 in the RGB space will much reduce the data size after JPEG compression and cause no degradation of the image quality.

The R plane contains frequency components (AC components) as well as no-frequency components (DC components). Therefore, for the R plane, the data size after JPEG compression will not be much reduced. However, since the data size of the G and B planes after compression is very small, the data size as a whole is reduced although the data size of the R plane after compression is somewhat large. That is, when an image that consists of white and cyan is represented in the RGB color space, the frequency components concentrate on a certain plane (the R plane). This reduces the data size after compression as a whole. Furthermore, there is no hue change because of no degradation of the image quality on the G and B planes (C2002). For the above reasons, cyan color copy-forgery-inhibited pattern image data should preferably be compressed in a color space (the RGB color space) that will reduce the data size after compression by concentrating the frequency components on a certain plane (the R plane).

To summarize the above, JPEG compression of chromatic (cyan) color copy-forgery-inhibited pattern image data in the RGB space causes the following situation when the JPEG-compressed image data is decompressed. That is, the data size of the compressed image data is much reduced, and there is no hue change.

<JPEG Compression of Black Color Copy-Forgery-Inhibited Pattern Image Data after Conversion from RGB Space into YCbCr Space>

Next, with reference to FIG. 1, characteristics of black color copy-forgery-inhibited pattern image data will be described. It is to be noted that FIG. 1 is a conceptual view representing the characteristics of the black color copy-forgery-inhibited pattern image data.

In the RGB color space, black is represented as (0, 0, 0) and white is represented as (255, 255, 255). In the YCbCr color space, black is represented as (0, 128, 128) and white is represented as (255, 128, 128). That is, the Y plane has frequency (AC) components as well as no-frequency (DC) components. Both Cb and Cr planes have color-difference components of the same value 128 either for white or black and has no frequency (AC) components. Thus, when an image that consists of black and white (i.e., a monochrome image) is represented in the YCbCr color space, the frequency components concentrate on a certain plane (the Y plane). Therefore, JPEG compression of black color copy-forgery-inhibited pattern image data C1001 after being converted from the RGB space into the YCbCr space (C1003) much reduces the data size after compression (C1004). This is because the size of data for the color-difference components (the Cb and Cr planes) is much reduced. Accordingly, black color copy-forgery-inhibited pattern image data should preferably be compressed in a color space (the YCbCr color space) that will reduce the data size after compression by concentrating the frequency components on a certain plane (the Y plane).

In addition, there is no change in the color of the copy-forgery-inhibited pattern image from black to other colors because of no degradation of data for the color-difference components of Cb and Cr.

To summarize the above, JPEG compression of black color copy-forgery-inhibited pattern image data after being converted from the RGB space into the YCbCr color space causes the following situation when the JPEG-compressed image data is decompressed. That is, the data size of the compressed image data is much reduced, and there is no hue change.

<JPEG Compression of Black Color Copy-Forgery-Inhibited Pattern Image Data in RGB Space>

Figure 1:
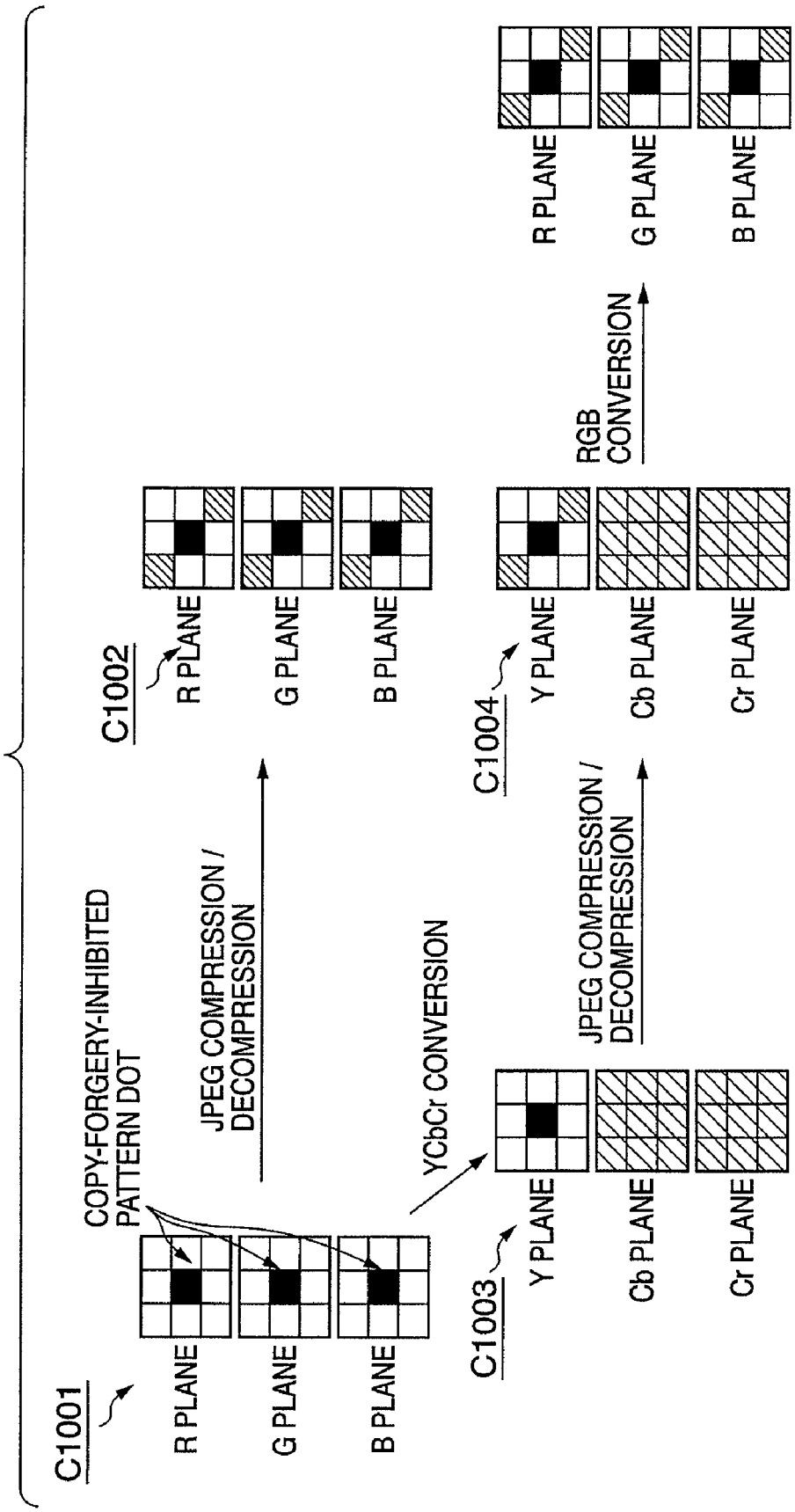
FIG. 1 is a conceptual view showing the relationship between a black color copy-forgery-inhibited pattern and JPEG compression.

In contrast, when black color copy-forgery-inhibited pattern image data C1001 is JPEG-compressed without conversion from the RGB space, all the R, G, and B planes have no-frequency (DC) components and frequency (AC) components as in the black color copy-forgery-inhibited pattern image data C1002 in FIG. 1. Therefore, the data size after JPEG compression is not much reduced. However, there is no hue change because the image quality degrades equally on all the R, G, and B planes. The R value of each pixel in the compressed and decompressed image data is equal to its B and G values, so that there is no hue change.

To summarize the above, JPEG compression of black color copy-forgery-inhibited pattern image data without conversion from the RGB space causes the following situation when the JPEG-compressed image data is decompressed. That is, the size of the compressed image data is not much reduced, and there is no hue change.

<Summary of JPEG Compression of Copy-Forgery-Inhibited Pattern Image Data of Certain Color in Certain Space>

FIG. 17 summarizes the above results. It can be seen from a table shown in FIG. 17 that chromatic color copy-forgery-inhibited pattern image data should be JPEG-compressed in the RGB space while black color copy-forgery-inhibited pattern image data should be JPEG-compressed in the YCbCr space. This is because either case reduces the data size and causes no hue change.

It can also be seen that JPEG compression of black color copy-forgery-inhibited pattern image data in the RGB space is better than JPEG compression of chromatic color copy-forgery-inhibited pattern image data in YCbCr space. This is because JPEG compression of black color copy-forgery-inhibited pattern image data in the RGB space causes no hue change.

For regular image data (image data that is not copy-forgery-inhibited pattern image data), degradation of color-difference components is typically hard to be recognized by human eyes. It is therefore desirable to compress such image data by using a quantization table having a larger quantization step for the color-difference components. That is, it is desired that regular image data be JPEG-compressed by using different quantization tables for the color-difference components (Cr and Cb) and for the luminance component (Y). For this purpose, regular image data is converted into the YCbCr space before JPEG compression.

Now, description will be given of an image processing system including: a color MFP (Multi-Function Peripheral, also referred to as a printer or an image processing apparatus) according to embodiments functioning based on the above-described principle; and a computer.

Figure 3:
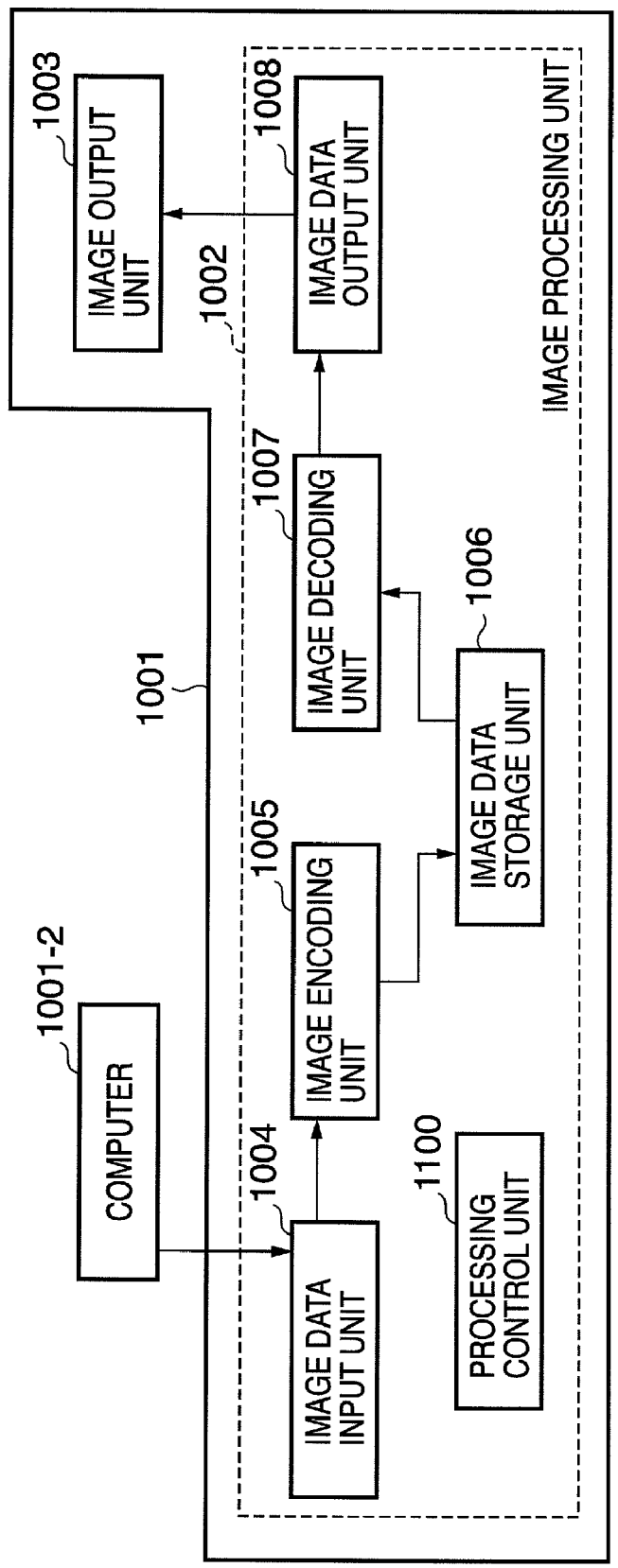
FIG. 3 is a diagram showing the overall configuration of an image processing system including an image processing apparatus according to embodiments of the present invention.

FIG. 3 is a diagram showing the overall configuration of the image processing system. Reference numeral 1001-2 denotes a computer (PC), and reference numeral 1001 denotes an image forming apparatus such as a color MFP. The image forming apparatus 1001 includes an image processing unit 1002 and an image output unit 1003. The image processing unit 1002 inputs a processed image to the image output unit 1003, which may be a printer. The image output unit 1003 forms a color image on a sheet.

<Configuration of Computer>

The image processing unit 1002 in the image forming apparatus 1001 can connect to the computer 1001-2, which is a data processing apparatus. The computer 1001-2 transmits a print job (print data+image data property information).

Usually, the computer 1001-2 incorporates document image data into the print data. The computer 1001-2 also incorporates "information indicating the absence of copy-forgery-inhibited pattern image data" into the image data property information.

However, the computer 1001-2 performs somewhat different processing when a user instructs printing with a copy-forgery-inhibited pattern. The computer 1001-2 generates print data including both copy-forgery-inhibited pattern image data and document image data. The computer 1001-2 sets, as the image data property information, "information indicating that it is image data with a copy-forgery-inhibited pattern" and "color information indicating whether the image data with the copy-forgery-inhibited pattern is image data with a black color copy-forgery-inhibited pattern or a chromatic color background pattern." The computer 1001-2 generates a print job from the image data property information set in this manner and the print data, and transmits the generated print job to the image forming apparatus 1001 (to the image data processing section 1002 therein).

The image processing unit 1002 determines whether the received print job includes copy-forgery-inhibited pattern image data based on the above-described image data property information. If copy-forgery-inhibited pattern image data is included, the image processing unit 1002 determines whether the copy-forgery-inhibited pattern image data is black color copy-forgery-inhibited pattern image data or chromatic color copy-forgery-inhibited pattern image data based on the above-described image data property information.

If it is determined that black color copy-forgery-inhibited pattern image data is included, the copy-forgery-inhibited pattern image data and the document image data are retrieved from the print data and combined to generate combined image data. An image encoding unit 1005 then JPEG-compresses the combined image data in the YCbCr color space.

If it is determined that chromatic color copy-forgery-inhibited pattern image data is included, the copy-forgery-inhibited pattern image data and the document image data are retrieved from the print data and combined to generate combined image data. The image encoding unit 1005 then JPEG-compresses the combined image data in the RGB color space.

If it is determined that no copy-forgery-inhibited pattern image data is included, the document image data is retrieved from the print data and JPEG-compressed by the image encoding unit 1005 in the YCbCr color space.

In any case, the JPEG-compressed image data (the encoded image data) is temporarily stored in an image data storage unit 1006.

An image decoding unit 1007 reads the JPEG-compressed image data in the image data storage unit 1006 and decodes it. The decoded image data is sent to the image output unit 1003 via an image data output unit 1008. The image output unit 1003 forms (prints) an image on a sheet. A processing control unit 1100 controls the entire image processing unit 1002.

In this manner, by performing JPEG compression in a color space suitable for the characteristics of the copy-forgery-inhibited pattern image data, image degradation due to JPEG compression can be minimized. Now, the image forming apparatus 1001 according to the embodiments will be specifically described below.

<Image Processing Unit>

Figure 4:
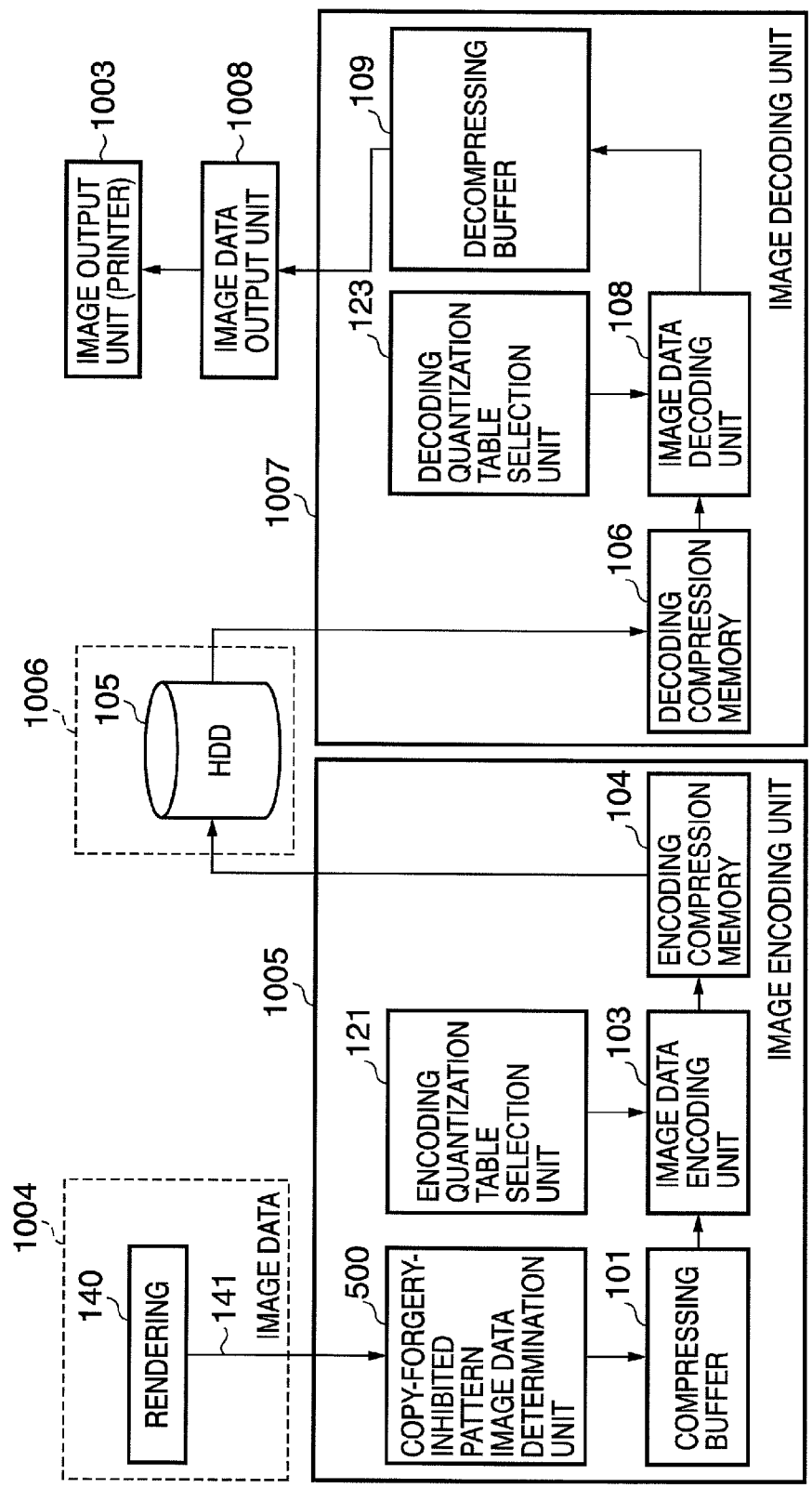
FIG. 4 is a functional block diagram of an image processing unit 1002 according to the embodiments of the present invention.
Figure 5:
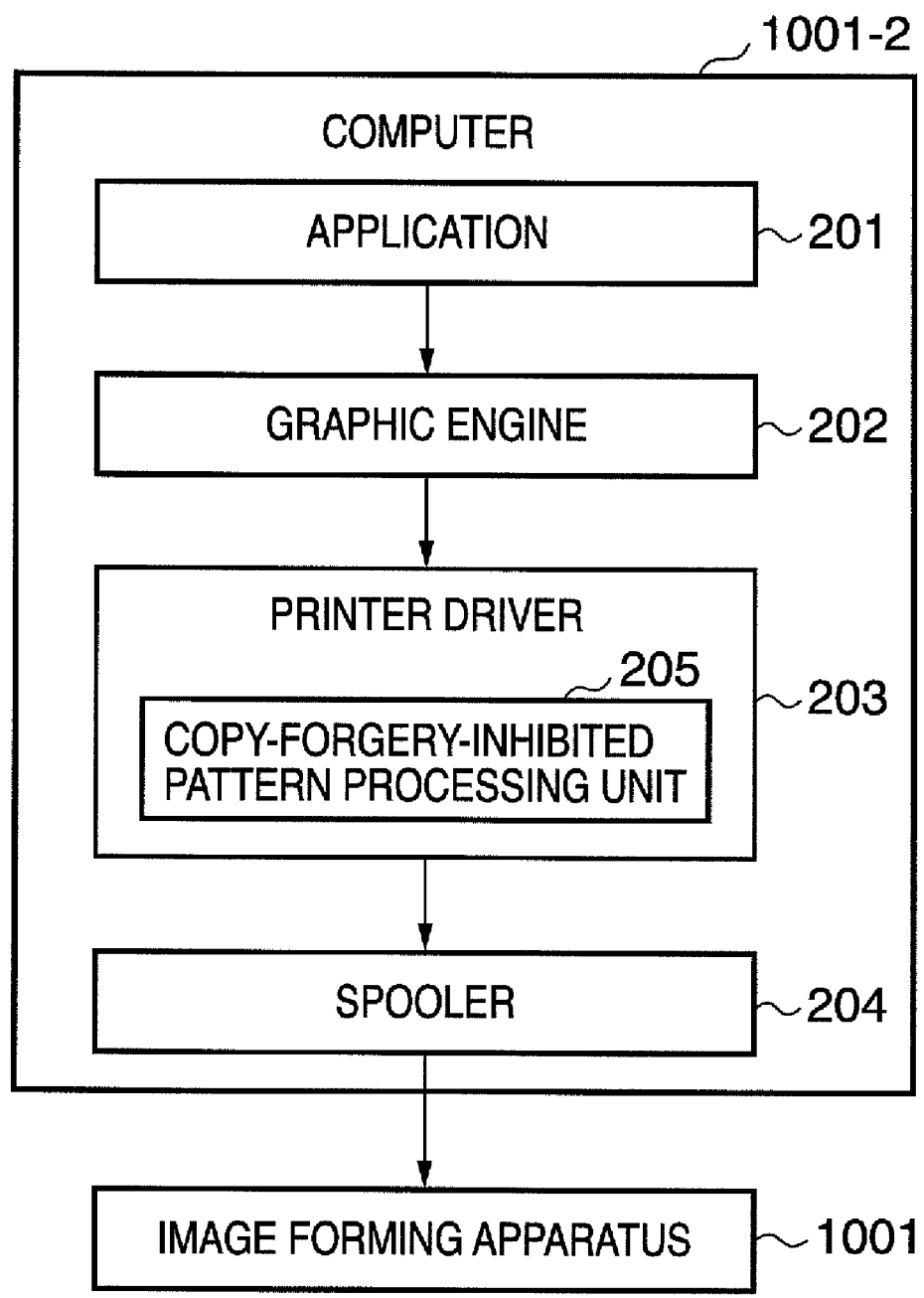
FIG. 5 is a functional block diagram of a computer 1001-2 according to a first embodiment of the present invention.

The image processing unit 1002 according to the embodiments will be specifically described below. FIG. 4 is a functional block diagram of the image processing unit 1002 according to a first embodiment of the present invention. In an image data input unit 1004, the print data (document image data+copy-forgery-inhibited pattern image data) and the image data property information are separated from the print job. A rendering unit 140 renders the print data as RGB image data.

The rendering unit 140 generates 32×32-pixel units of bitmap RGB image data 141 according to the input print data. If the input print data includes copy-forgery-inhibited pattern image data as well as the document image data, the rendering unit 140 first renders the document image data in units of 32×32 pixels and then renders the copy-forgery-inhibited pattern image data also in units of 32×32 pixels. In this manner, the two image data items are sequentially rendered and thereby combined to generate 32×32-pixel units of combined image data. That is, if the print job includes copy-forgery-inhibited pattern image data, the image data 141 will be 32×32-pixel units of combined bitmap image data. If the document image data is blank page data, the combined image data equals to the copy-forgery-inhibited pattern image data. In that case, the image data 141 will be 32×32-pixel units of bitmap copy-forgery-inhibited pattern image data.

The image encoding unit 1005 and the image decoding unit 1007 encodes and decodes the 32×32-pixel units of image data 141 input from the image data input unit 1004. The image data storage unit 1006 stores the encoded data encoded in the image encoding unit 1005.

A copy-forgery-inhibited pattern image data determination unit 500 determines whether the image data 141 is image data with a copy-forgery-inhibited pattern based on the image data property information. If the image data 141 is image data with a copy-forgery-inhibited pattern, color determination is made for determining whether the image data is image data with a black color copy-forgery-inhibited pattern or a chromatic color background pattern. In this embodiment, this determination may be made by image recognition. The image data 141 is temporarily accumulated in a compressing buffer 101.

An image data encoding unit 103 encodes the image data output from the compressing buffer 101. The image data encoding unit 103 encodes the image data by using a quantization table selected by an encoding quantization table selection unit 121. If the compressed image does not fit into a predetermined memory capacity, the image data encoding unit 103 causes the encoding quantization table selection unit 121 to reselect a quantization table and again encodes the image data output from the compressing buffer 101. This processing is repeated until the image data fits into the predetermined memory capacity. The reselected quantization table has a larger quantization step than that of the quantization table selected immediately before. Therefore, the size of the JPEG-compressed image data is gradually reduced. In this manner, the size of the JPEG-compressed image data is gradually reduced for fitting the image data corresponding to one page into the allocated memory size.

The encoding quantization table selection unit 121 selects a quantization table that causes less image degradation but allows not much compression, and initially sets this quantization table for the image data encoding unit 103. The image data encoding unit 103 uses the set quantization table to perform JPEG compression. If the compressed image data does not fit into the allocated memory size, the image data encoding unit 103 decompresses the JPEG-compressed image data and again JPEG-compresses the decompressed image data by using a new quantization table. The new quantization table used this time causes more image degradation but provides a smaller size of JPEG-compressed data than the first quantization table. The new quantization table used this time is also, of course, set by the encoding quantization table selection unit 121 for the image data encoding unit 103.

In this manner, a quantization table that provides a smaller size of compressed data is sequentially set to continue compression of the image data until it fits into the allocated memory size.

A plurality of quantization tables are stored in advance in an HDD or ROM. FIG. 9 shows exemplary quantization tables. The quantization tables in FIG. 9 illustrate quantization tables for DCT coefficients of 8×8 pixels. In FIG. 9, a quantization table T1 provides the largest size of compressed data but causes the least image degradation instead. A quantization table with a higher table number provides a smaller size of compressed data but causes more image degradation instead. The encoding quantization table selection unit 121 sequentially outputs the quantization tables starting from T1 to the image data encoding unit 103.

An encoding compression memory 104 stores the 32×32-pixel units of encoded data obtained by the image data encoding unit 103 until the encoded data corresponding to one page is accumulated. Once the encoded data corresponding to one page is accumulated, the encoding compression memory 104 outputs it to an HDD 105. The 32×32-pixel units of encoded data have the image data property information attached thereto as their header information. This image data property information is also accumulated in the hard disk (HDD) 105.

A decoding compression memory 106 sequentially receives the 32×32-pixel units of encoded image data in the hard disk (HDD) 105 from the HDD.

An image data decoding unit 108 decodes the encoded data by using an inverse quantization table selected by a decoding quantization table selection unit 123.

The inverse quantization table corresponds to the quantization table used in encoding.

A decompressing buffer 109 stores the image data obtained by the image data decoding unit 108 corresponding to 32 lines and outputs the image data to the image data output unit 1008. The image data is output from the image data output unit 1008 to the electrophotographic image output unit 1003 to form an image on a sheet. The reason for storing the image data corresponding to 32 lines in the decompressing buffer 109 at the final stage is to align with the timing of the image output unit 1003.

Figure 8:
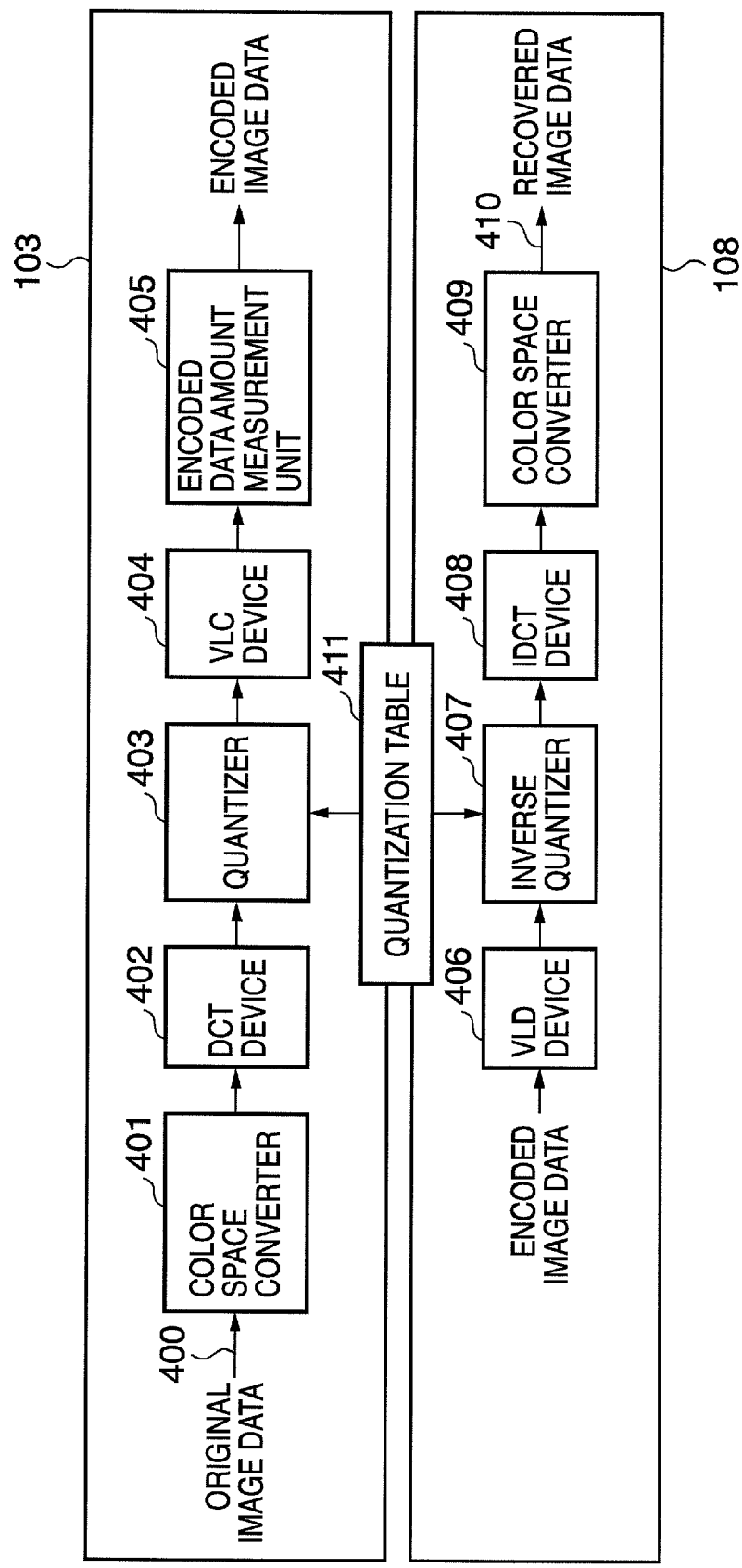
FIG. 8 is a diagram showing the internal configuration of an image data encoding unit and an image data decoding unit in the image processing apparatus according to the embodiments of the present invention.

FIG. 8 shows the internal configuration of the image data encoding unit 103 and the image data decoding unit 108 shown in FIG. 4.

The image data encoding unit 103 includes a color space converter 401, a discrete cosine transformation (DCT) device 402, a quantizer 403, and a variable-length coding (VLC) device 404. The image data decoding unit 108 includes a variable-length decoding (VLD) device 406, an inverse quantizer 407, an inverse DCT (IDCT) device 408, and a color space converter 409.

The image data 141 input from the compressing buffer 101 is color image signals represented in a color space of red (R), green (G), and blue (B) in which each color component has a signal of 256 steps of gradation (RGB image signals).

The color space converter 401 can convert the RGB image data 141 into YCbCr image data, which is luminance/color-difference signals. The color space converter can also output the input RGB image data 141 without conversion.

The DCT (discrete cosine transformation) device 402 subjects the image output from the color space converter 401 to spatial frequency transformation (DCT transformation) in units of 8×8 pixels.

The quantizer 403 reduces the data amount of image data by using a quantization table selected by the encoding quantization table selection unit 121 to quantize DCT coefficients obtained by the DCT device 402.

In the variable-length coding (VLC) device 404, the quantized DCT coefficients obtained by the quantizer 403 is, for example, zigzag-scanned according to a JPEG compression procedure and Huffman-coded. Thus, the VLC device 404 further reduces the data amount of image data to obtain encoded image data.

An encoded data amount measurement unit 405 measures the encoded data amount of encoded image data obtained by the variable-length coding (VLC) device 404. If the encoded data amount exceeds an allocated memory amount, the encoded data amount measurement unit 405 instructs to redo the image encoding processing. Specifically, the encoded data amount measurement unit 405 sums up the amount of encoded image data output from the variable-length coding (VLC) device 404 on a page-by-page basis. If the sum exceeds a predetermined reference value (i.e., the permitted allocated memory amount), the image data encoding unit 103 is notified thereof. Upon reception of the notification, the image data encoding unit 103 decompresses the JPEG-compressed image data in units of 32×32 pixels. The image data encoding unit 103 reattempts to compress the 32×32-pixel units of decompressed image data by using a quantization table having a one-size larger quantization step.

The color space converter 401 in FIG. 8 functions as color space determination means for determining a color space for JPEG-compressing the image data with a copy-forgery-inhibited pattern based on the result of determination of the copy-forgery-inhibited pattern image data determination unit 500. In addition, the color space converter 401 performs conversion into the determined color space as necessary. The image data encoding unit 103 functions as JPEG compression means for JPEG-compressing the image data with the copy-forgery-inhibited pattern in the determined color space. The image data encoding unit 103 further functions as control means by which the image data with the copy-forgery-inhibited pattern that has been JPEG-compressed by the image data encoding unit 103 is stored in the encoding compression memory or HDD serving as storage means.

The encoded image data stored in the hard disk 105 is input to the VLD device 406 via the decoding compression memory 106. The encoded image data is subjected to Huffman decoding (is decoded) to recover the quantized DCT coefficients.

The inverse quantizer 407 uses an inverse quantization table selected by the decoding quantization table selection unit 123 so that the quantized DCT coefficients, recovered by the variable-length decoding (VLD) device 406, is brought back to the DCT coefficients. The quantization table used in the encoding processing and the inverse quantization table used in the decoding processing are the same table. Therefore, if a quantization table is attached to the accumulated encoded image data, the decoding quantization table selection unit 123 selects the quantization table attached to the encoded image data as the inverse quantization table.

The IDCT (Inverse DCT transformation) device 408 recovers the image data by performing inverse DCT for the DCT coefficients obtained by the inverse quantizer 407.

If the image data recovered by the inverse DCT device 408 is YCbCr image data, the color space converter 409 converts the image data into RGB image data and outputs it as image data 410. If the image data obtained by the inverse DCT device 408 is RGB image data, the color space converter 409 outputs it as the image data 410 without conversion. As a result, the RGB image data 410, which is the output of the image data decoding unit 108, is sent to the image output unit. The image output unit converts the RGB image data into YMCK image data and prints it out. Whether the image data is YCbCr image data or RGB image data is determined based on the header information attached to the encoded image data stored in the HDD 105.

Figure 10:
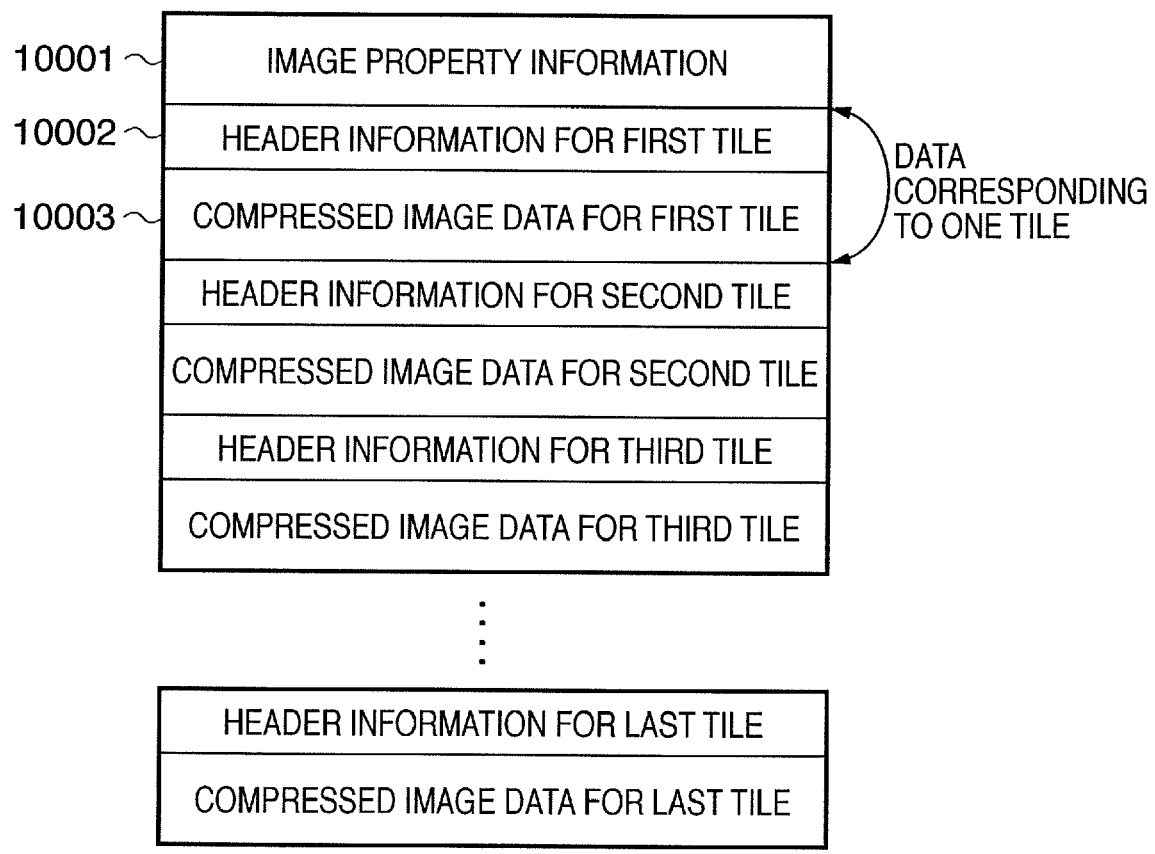
FIG. 10 is a conceptual view showing the data structure with which JPEG-compressed image data and image data property information are stored in an encoding JPEG compression memory in the image processing apparatus according to the embodiments of the present invention.
Figure 11A:
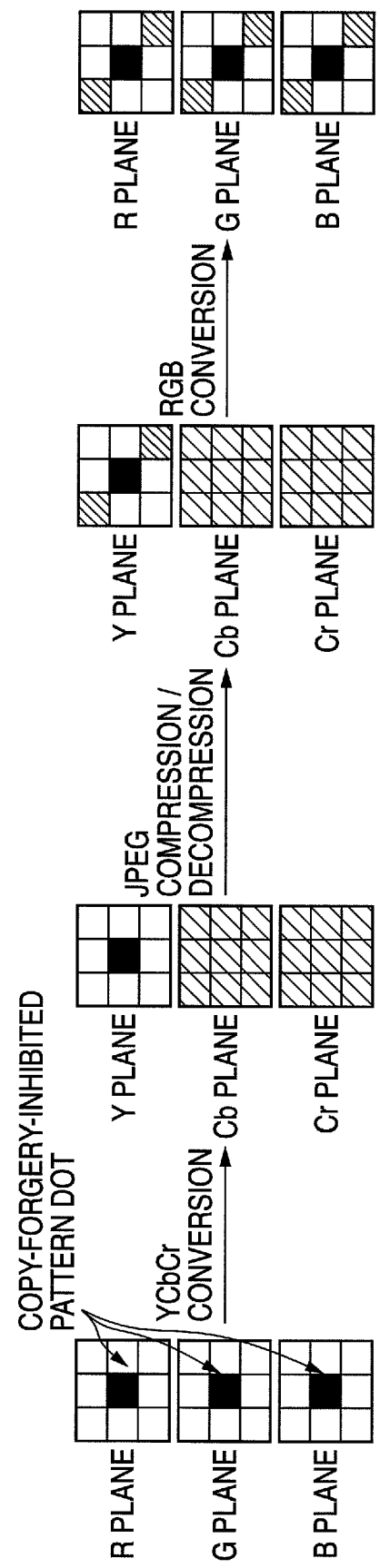
FIG. 11A is a conceptual view showing an effect of the first embodiment of the present invention.
Figure 11B:
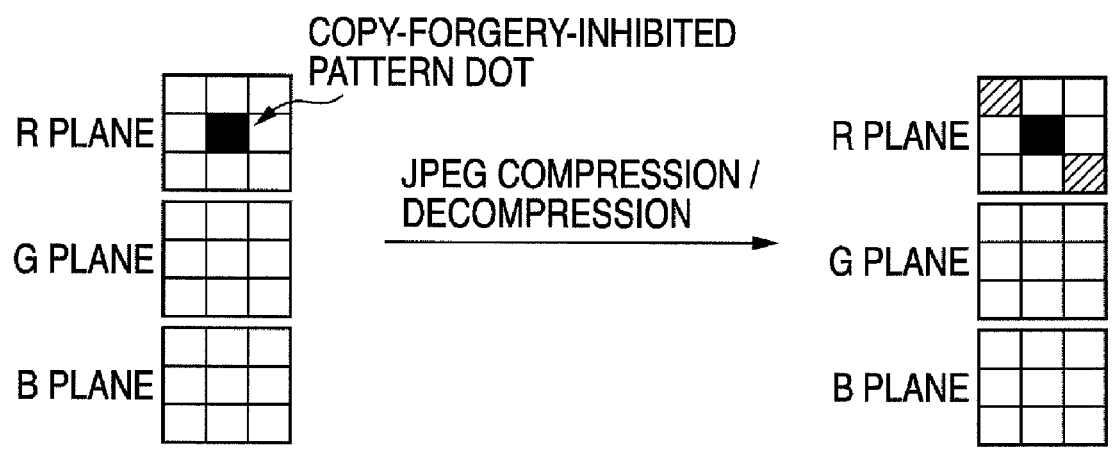
FIG. 11B is a conceptual view showing an effect of the first embodiment of the present invention.

FIG. 10 is a conceptual view showing the data structure with which the JPEG-compressed image data (i.e., the encoded image data) is stored in the encoding compression memory 104. The image data property information 10001 is stored in the header section at the top of the data, below which the 32×32-pixel units (i.e., a tile) of JPEG-compressed image data 10003 and header information 10002 of respective tiles are stored. Although the image data property information is stored in the header section of the encoded data in this embodiment, the image data property information may be stored as a separate file associated with the encoded data. The identification number of the above-described quantization table and information indicating the color space are added as part of the image data property information contained in the header.

<Encoding Procedure>

Figure 6:
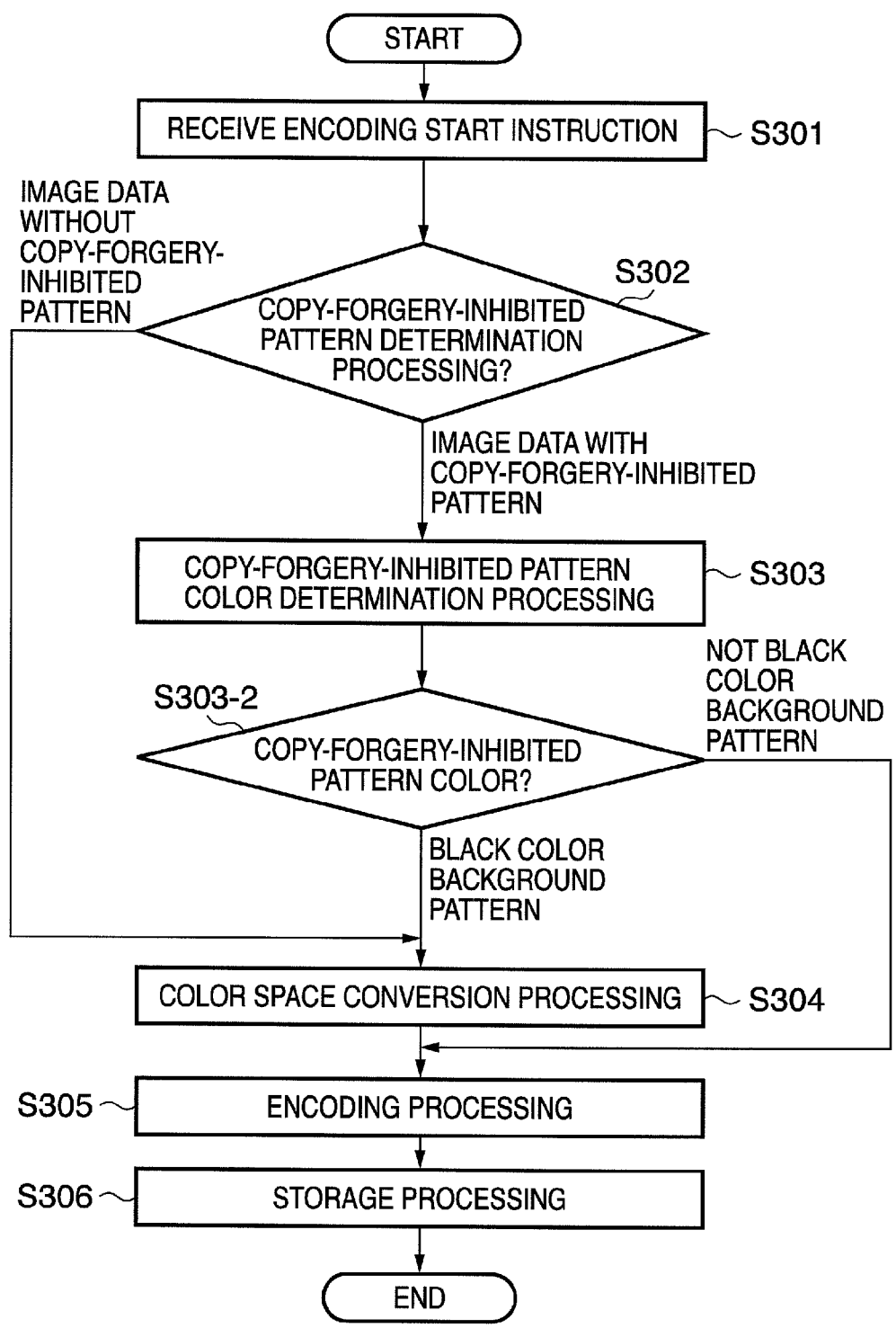
FIG. 6 is a flowchart for performing encoding processing in the image processing apparatus according to the embodiments of the present invention.

FIG. 6 is a flowchart of encoding processing in the above-described image processing unit 1002. The agent in each step is as described below. However, when the image processing unit 1002 is implemented by software, a CPU controlling the image forming apparatus 1001 is the agent in FIG. 6.

Step S301:

The image data input unit 1004 receives a print job from the computer 1001-2. The image data input unit 1004 sends print data in the print job input from the computer 1001-2 to a page description language rendering unit 140. The page description language rendering unit 140 converts the print data into 32×32-pixel units of bitmap image data and outputs the image data.

The print job received from the computer 1001-2 includes image data property information indicating whether the print job includes copy-forgery-inhibited pattern image data, and whether the copy-forgery-inhibited pattern image data is a black color copy-forgery-inhibited pattern or a chromatic color background pattern. The image data input unit 1004 attaches these image data property information items as header information of each 32×32-pixel unit of bitmap image data 141. The image data input unit 1004 outputs the bitmap image data 141 and the attached data (the image data property information) for accumulation in the JPEG compressing buffer 101. The output bitmap image data 141 is accumulated in the JPEG compressing buffer 101 via the copy-forgery-inhibited pattern image data determination unit 500.

Step S302:

The copy-forgery-inhibited pattern image data determination unit 500 refers to the above-described image data property information in the header to determine whether the image data 141 is image data with a copy-forgery-inhibited pattern.

If the image data property information indicates "1. image data without a copy-forgery-inhibited pattern", the copy-forgery-inhibited pattern image data determination unit 500 determines that it is not an image with a copy-forgery-inhibited pattern.

If the image data property information indicates "2. image data with a copy-forgery-inhibited pattern: a black color background pattern" or "3. image data with a copy-forgery-inhibited pattern: a chromatic color background pattern," the copy-forgery-inhibited pattern image data determination unit 500 determines that it is an image with a copy-forgery-inhibited pattern.

In this embodiment, frequency characteristics of the image data 141 may be detected by an image recognition technique to determine whether or not the image data 141 is image data with a copy-forgery-inhibited pattern based on the detection result. If it is determined that it is image data with a copy-forgery-inhibited pattern, the process proceeds to step S303. Otherwise (if it is a regular image without a copy-forgery-inhibited pattern), an instruction is sent to the image data encoding unit 103 that the image data should be JPEG-compressed in the YCbCr color space. The process then transitions to step S304. Thus, regular image data (image data without a copy-forgery-inhibited pattern) will be JPEG-compressed after converted into the YCbCr color space.

Step S303:

The copy-forgery-inhibited pattern image data determination unit 500 further performs color determination for determining whether the image data identified as image data with a copy-forgery-inhibited pattern is image data with a black color background pattern. In this embodiment, whether the image data is image data with a black color copy-forgery-inhibited pattern is determined based on the image data property information. It is determined that the image data is image data with a black color copy-forgery-inhibited pattern if the image data property information indicates "2. image data with a copy-forgery-inhibited pattern: a black color background pattern", and it is determined that the image data is not image data with a black color copy-forgery-inhibited pattern if the image data property information indicates "3. image data with a copy-forgery-inhibited pattern: a chromatic color background pattern." Of course, it means the same to determine that the image data is not image data with a chromatic color copy-forgery-inhibited pattern if the image data property information indicates "2. image data with a copy-forgery-inhibited pattern: a black color background pattern", and to determine that the image data is image data with a chromatic color copy-forgery-inhibited pattern if the image data property information indicates "3. image data with a copy-forgery-inhibited pattern: a chromatic color background pattern." In this embodiment, the color of the image data 141 may be detected by an image recognition technique to determine whether it is image data with a black color copy-forgery-inhibited pattern based on the detection result.

Step S303-2:

The image data determination unit 500 provides the image data encoding unit 103 with color space information based on the determination result in step S303. If it is determined that the image data is image data with a black color background pattern, the color space information indicates that the image data should be JPEG-compressed in the YCbCr color space. If it is determined that the image data is image data with a chromatic color background pattern, the color space information indicates that the image data should be JPEG-compressed in the RGB color space. The process transitions to step S304 for image data with a black color background pattern, or to step S305 otherwise (for image data with a chromatic color background pattern).

The reason why the image data identified as image data with a chromatic color copy-forgery-inhibited pattern is JPEG-compressed in the RGB space is indicated in FIG. 17. The reason why the image data identified as image data with a black color copy-forgery-inhibited pattern is JPEG-compressed in the YCbCr space is also indicated in FIG. 17.

Step S304:

Processing in step S304 is performed if it is determined that the image data is image data with a black color copy-forgery-inhibited pattern or image data without a copy-forgery-inhibited pattern. If it is determined that the image data is image data with a chromatic color background pattern, the processing in step S304 is not performed. This is for JPEG-compressing the image data identified as image data with a chromatic color copy-forgery-inhibited pattern without conversion from the RGB color space.

The image data encoding unit 103 reads out the image data in units of 32×32 pixels from the JPEG compressing buffer 101. The color space converter 401 converts the read-out RGB image data into the YCbCr image data. The above-described conversion formulas are used for the conversion. Alternatively, other conversion formulas for converting into luminance/color-difference signals may be used. Here, information indicating that the image data is YCbCr image data is added to the image data property information. The process transitions to step S305.

Step S305:

The image data encoding unit 103 causes the DCT device 402 to perform spatial frequency transformation (DCT transformation) for the input image data. DCT coefficients obtained by the transformation are quantized in the quantizer 403 with a quantization table selected by the quantization table selection unit 121. The quantized DCT coefficients are Huffman-coded in the VLC device 404 to obtain encoded image data. The data amount of the obtained encoded image data is measured in the encoded data amount measurement unit 405. If the encoded image data does not fit into a predetermined memory capacity, a quantization table providing a one-step higher JPEG compression rate is selected to reattempt JPEG compression. For this purpose, if step S304 has been performed, the process repeats steps S304 and S305 because the image data subjected to the color-space conversion is not saved. If the image data subjected to the color-space conversion is saved, only step S305 may be repeated. If step S304 has not been performed, step S305 is repeated. This time, the processing control unit 1100 instructs the quantization table selection unit 121 to select a quantization table providing a higher JPEG compressing rate. When the encoded image data corresponding to one page fits into the predetermined memory capacity, the processing control unit 1100 performs step S306.

Step S306:

The image data encoding unit 103 temporarily stores the encoded image data encoded in step S305 in the encoding compression memory 104. The encoded image data temporarily stored in the encoding compression memory 104 is transferred to the hard disk 105 and accumulated there. This transfer of the encoded image data is controlled by the processing control unit (e.g., a CPU) 1100 that controls the entire image processing unit 1002. Thus, the encoded image data (and the image data property information attached thereto) accumulated in the encoding compression memory 104 is stored in the hard disk 105. As described above, the processing in FIG. 6 is performed autonomously by each functional block by using data and control signals communicated between each functional block. Alternatively, the processing control unit 1100 may control the functional blocks to perform their respective processing.

In FIG. 6, step S303 is a color determination step for determining the copy-forgery-inhibited pattern color based on the image data property information. Step S303-2 is a color space determination step for determining the color space for JPEG-compressing the image data with a copy-forgery-inhibited pattern based on the result of determination of the copy-forgery-inhibited pattern color. Steps S304 and 305 are JPEG compression steps for JPEG-compressing the image data with the copy-forgery-inhibited pattern in the determined color space. Step S306 is a control step for storing the JPEG-compressed image data with the copy-forgery-inhibited pattern in the storage means.

<Decoding Procedure>

Figure 7:
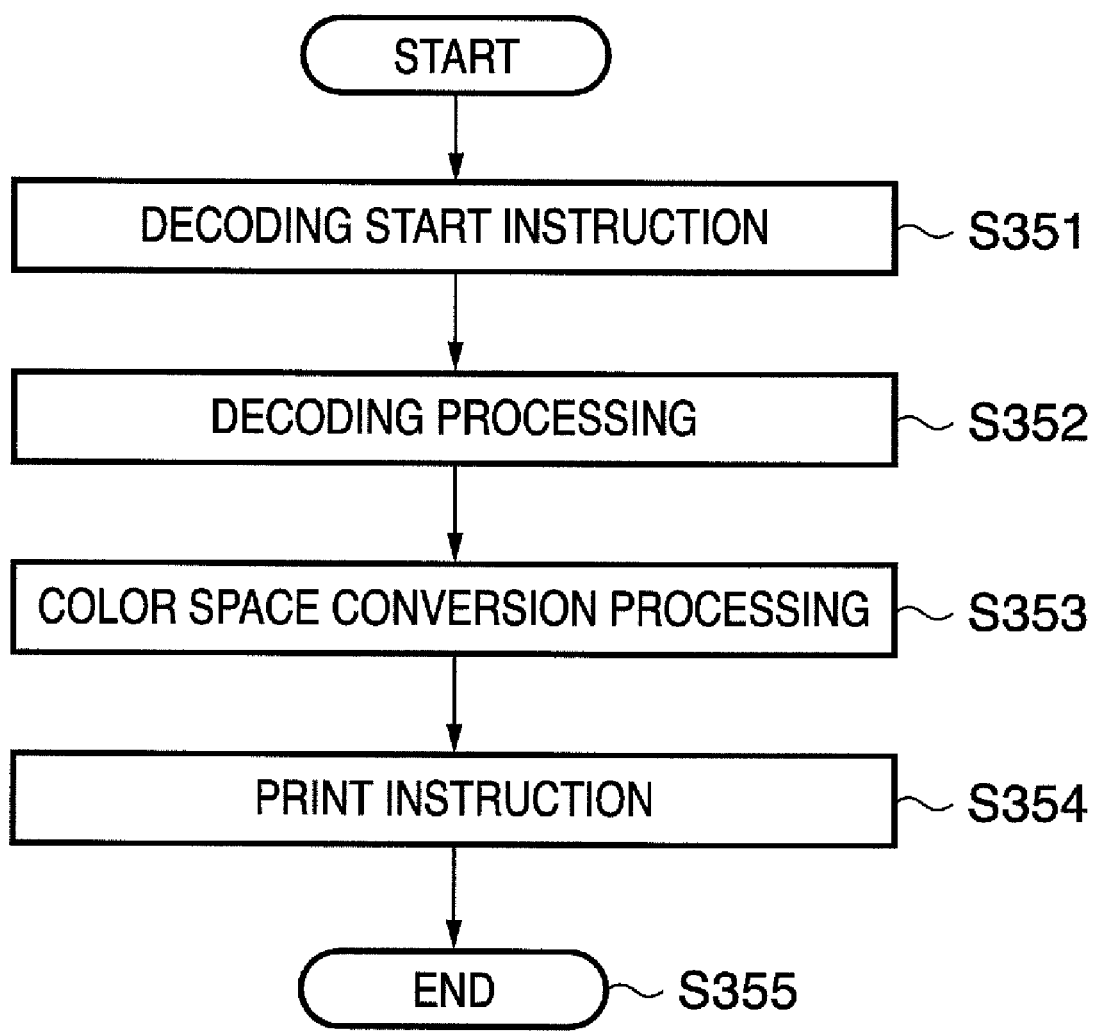
FIG. 7 is a flowchart for performing decoding processing in the image processing apparatus according to the embodiments of the present invention.

FIG. 7 shows a flowchart of decoding processing in the image processing unit 1002.

Step S351:

Once a decoding start instruction is received, the processing control unit 1100 reads out the encoded image data from the hard disk 105 and temporarily stores it in the decoding compression memory 106. The decoding start instruction is issued by the processing control unit 1100 when a job termination command is input from the computer 1001-2 or when a certain time has passed since input of print data stopped, for example.

Step S352:

The VLD device 406 receives input of the image data from the decoding compression memory 106 and performs Huffman decoding (decodes the image data). The decoding quantization table selection unit 123 selects an inverse quantization table corresponding to the quantization table used for encoding based on the image data property information and sends it to the inverse quantizer 407. The inverse quantizer 407 brings the data processed by the VLD device 406 back to the DCT coefficients, and the IDCT device 408 brings the DCT coefficients back to the image data. The processing control unit performs step S353.

Step S353:

If the image data is YCbCr image data, the color space converter 409 converts the YCbCr image data back into RGB image data. Thus, the image data is finally decoded into the RGB image data. Whether the image data is RGB image data or YCbCr image data is determined by using the color space information added in step S304 to the image data property information. The processing control unit performs step S354. If the image data is RGB image data, no conversion is performed.

Step S354:

The image data decoding unit 108 temporarily accumulates, in the decompressing buffer 109, the image data decoded and subjected to the color-space conversion as necessary. Once the decoding processing is completed, the processing control unit 1100 sends a print instruction to the image data output unit 1008. In response to the print instruction, the image data output unit 1008 receives the image data accumulated in the decompressing buffer 109 and outputs it to the image output unit 1003 (a printer unit). The image data is printed out in the image output unit 1003.

As described above, according to this embodiment, the image data is JPEG-compressed in a color space suitable for the copy-forgery-inhibited pattern color with consideration for the characteristics of copy-forgery-inhibited pattern image data. This allows reduction of the size of the compressed data and causes no change in the hue of the copy-forgery-inhibited pattern image.

Second Embodiment

Figure 12:
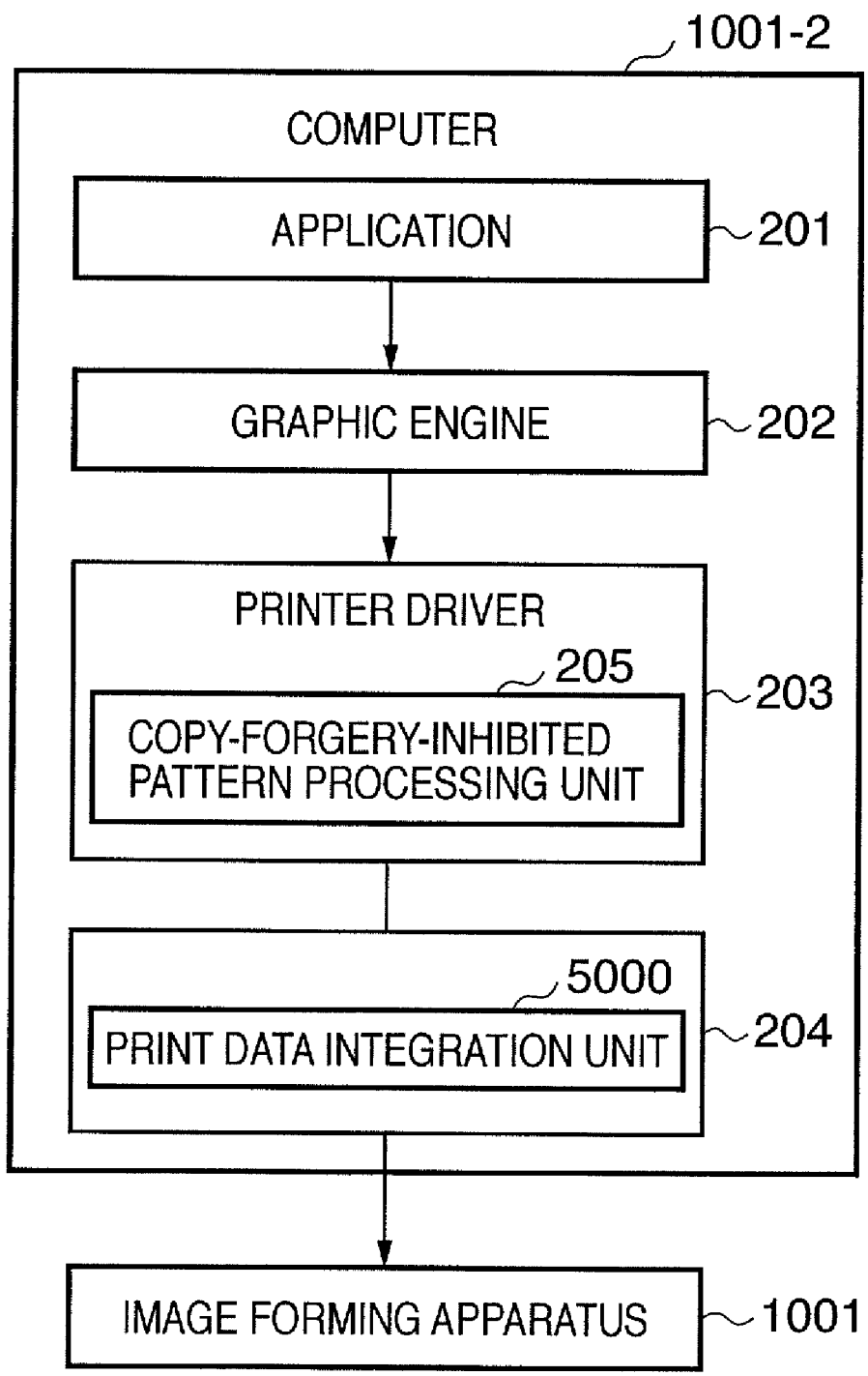
FIG. 12 is a functional block diagram of a computer 1001-2 according to a second embodiment of the present invention.
Figure 14B:
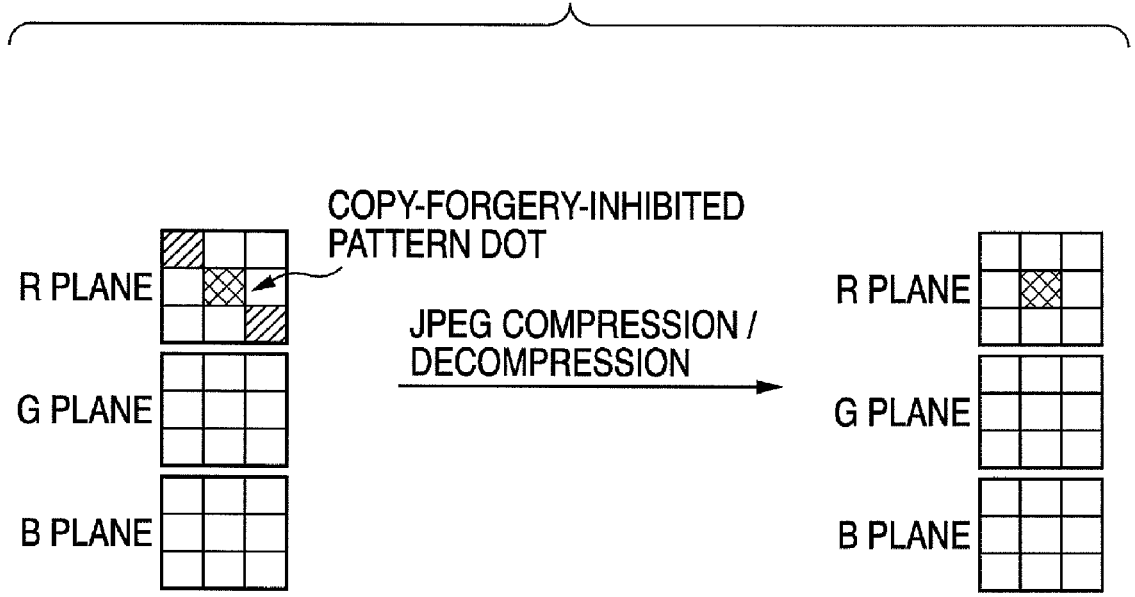
FIG. 14B is a conceptual view showing an effect of the second embodiment of the present invention.

Now, a second embodiment of the present invention will be described mainly with respect to what are different from the first embodiment. FIG. 12 shows a block diagram of a computer 1001-2 in which print data items can be integrated by a spooler 204. When an application 201 causes a printer 1003 to perform printing, a graphic engine 202 is used for output (rendering).

The graphic engine 202 converts a GDI (Graphic Device Interface) function received from the application 201 into a DDI (Device Driver Interface) function. The graphic engine 202 outputs the DDI function to a printer driver 203.

Based on the DDI function received from the graphic engine 202, the printer driver 203 converts data into image data (print data) described in a page description language. The print data has image data property information as header information. The image data property information includes information such as an ID, indication of a print method, and the print date and time.

The printer driver 203 includes a copy-forgery-inhibited pattern processing unit 205. The copy-forgery-inhibited pattern processing unit 205 may be a built-in module of the printer driver 203 or may take the form of a library module added by individual installation. With respect to the printing of image data with a copy-forgery-inhibited pattern, the printer driver 203 executes its copy-forgery-inhibited pattern processing unit 205 to render the copy-forgery-inhibited pattern and attach it to the print data described in the page description language, thereby creating image data with the copy-forgery-inhibited pattern. When the copy-forgery-inhibited pattern is attached, information about the attached copy-forgery-inhibited pattern is added to the image data property information. The information to be added includes information indicating whether the image is image data with a copy-forgery-inhibited pattern, and if so, whether the copy-forgery-inhibited pattern is a black color copy-forgery-inhibited pattern or a chromatic color background pattern. Specifically, the information includes one of three items: "1. image data without a copy-forgery-inhibited pattern", "2. image data with a copy-forgery-inhibited pattern: a black color background pattern", and "3. image data with a copy-forgery-inhibited pattern: a chromatic color background pattern."

The print data is spooled in the spooler 204. The spooler 204 can spool a plurality of print data items, which can be integrated by a print data integration unit 5000. In this manner, print data items from different application data items can be integrated into a single print data item. This provides advantages such as the ability of printing after bookbinding processing. The integrated print data can have only one image data property information item (the reason for this will be described later). Therefore, if the unintegrated print data items include regular image data, image data with a black color background pattern, and image data with a chromatic color copy-forgery-inhibited pattern (or at least two of them), it is necessary to determine which is to be added to the image data property information for the integrated print data, i.e., it is necessary to select one out of the three items: "1. image data without a copy-forgery-inhibited pattern", "2. image data with a copy-forgery-inhibited pattern: a black color background pattern", and "3. image data with a copy-forgery-inhibited pattern: a chromatic color background pattern."

When integrating a plurality of print data items, the computer 1001-2 determines a print data item whose attached image data property information is selected. This processing will be described with reference to FIG. 13. Processing of FIG. 13 is performed by the print data integration unit 5000. Since the print data integration unit 5000 is software, the processing is actually performed by a processor of the computer 1001-2. The computer 1001-2 described as the agent of the processing in the following description refers to this processor.

Step S601:

It is determined whether a plurality of print data items to be integrated include image data with a copy-forgery-inhibited pattern. If image data property information indicating "2. image data with a copy-forgery-inhibited pattern: a black color background pattern" or "3. image data with a copy-forgery-inhibited pattern: a chromatic color background pattern" is attached to any of the print data items, it is determined that image data with a copy-forgery-inhibited pattern is included. The computer 1001-2 performs S602 only if it is determined that image data with a copy-forgery-inhibited pattern is included. Otherwise, the computer 1001-2 performs S603.

Step S602:

The print data integration unit 5000 determines whether any of the print data items to be integrated includes image data with a chromatic color background pattern. This is determined based on the image data property information. If image data property information indicating "3. image data with a copy-forgery-inhibited pattern: a chromatic color background pattern" is attached to any of the print data items, it is determined that image data with a chromatic color copy-forgery-inhibited pattern is included. The computer 1001-2 performs S604 only if it is determined that image data with a chromatic color copy-forgery-inhibited pattern is included. Otherwise, the computer 1001-2 performs S605.

Step S603:

Since the print data items to be integrated include only print data items that do not include image data with a copy-forgery-inhibited pattern, the computer 1001-2 adds information indicating "1. image data without a copy-forgery-inhibited pattern" to the image data property information.

Step S604:

The computer 1001-2 adds information indicating "3. image data with a copy-forgery-inhibited pattern: a chromatic color background pattern" to the image data property information. When the process branches to step S604, besides the image data with a chromatic color background pattern, the print data items to be integrated may include print data without a copy-forgery-inhibited pattern or print data with a black color background pattern. However, JPEG-compression of image data with a chromatic color copy-forgery-inhibited pattern in the YCbCr color space will cause degradation of color difference information. This can lead to a chromatic color copy-forgery-inhibited pattern that is not saturated color, which significantly reduces the effect as a copy-forgery-inhibited pattern. Therefore, the image data property information indicating that the data is image data with a chromatic color copy-forgery-inhibited pattern is attached to the entire print data items that include the image data with a chromatic color background pattern.

Step S605:

Since only image data with a black color copy-forgery-inhibited pattern is included, information indicating "2. image data with a copy-forgery-inhibited pattern: a black color background pattern" is added to the image data property information for the print data items to be integrated.

<Reason for Preferentially Designating Image Data with Chromatic Color Background Pattern>

In this manner, if at least one of the print data items includes image data with a copy-forgery-inhibited pattern in step S601, the image data property information indicating that the data is image data with a copy-forgery-inhibited pattern is attached to the integrated print data. Further, if at least one of the print data items includes image data with a chromatic color copy-forgery-inhibited pattern in step S602, the print data items are identified as image data with a chromatic color background pattern. Thus, the order of priority is, in decreasing order, image data with a chromatic color background pattern, image data with a black color background pattern, and regular image data. FIG. 17 accounts for giving priority to image data with a chromatic color copy-forgery-inhibited pattern over image data with a black color background pattern. That is, JPEG compression of image data with a black color copy-forgery-inhibited pattern in the RGB space is better than JPEG compression of image data with a chromatic color copy-forgery-inhibited pattern in YCbCr space. The reason why image data with a black color copy-forgery-inhibited pattern is given priority over regular image data is that JPEG compression causes significant problems for image data with a copy-forgery-inhibited pattern rather than for regular image data.

In this manner, the print data is generated and input to the image forming apparatus 1001. The configuration and processing of the image forming apparatus 1001 is as described in the first embodiment.

As described above, according to this embodiment, a saturated color of a chromatic color copy-forgery-inhibited pattern can be maintained by adding copy-forgery-inhibited pattern information to the image data property information with consideration for the characteristics of copy-forgery-inhibited pattern image data. This allows high-quality printing of an image with a copy-forgery-inhibited pattern, and also reduction of the capacity of memory provided in the image forming apparatus.

In practice, what is important is to convert between the RGB color space and the luminance/color-difference color space, and the conversion formulas are not limited to those described in the description of the related art. The conversion formulas may be modified with consideration for the bit precision and the inverse-conversion precision. Therefore, the conversion between the RGB color space and the YCbCr color space performed in the color space conversion described in the description of the embodiments may be replaced with conversion between the RGB color space and other luminance/color-difference spaces.

The first and second embodiments have been described for JPEG compression and decompression in the image forming apparatus that prints a copy-forgery-inhibited pattern image. The present invention is also applicable to the case where a copy-forgery-inhibited pattern image is stored in, for example, an image server and provided therefrom. The present invention is also applicable to the case where a copy-forgery-inhibited pattern image is provided via an application program in a client computer. These cases require holding the copy-forgery-inhibited pattern image data in a computer, desirably in a JPEG-compressed form. By causing the computer to function as the image processing unit 1002 in the first embodiment, the copy-forgery-inhibited pattern image data can be JPEG-compressed and stored without degradation of the image quality. The image processing unit 1002 here corresponds to an image processing apparatus, which is an independent apparatus implemented by the computer. The JPEG-compressed copy-forgery-inhibited pattern image data is stored in storage such as an HDD until it is reused, and in response to a reuse instruction from a user, it is read out and decompressed according to the instruction. An image output unit, i.e., a printer is required only if the image data is printed.

Other Embodiments

The present invention may be applied to a system composed of a plurality of devices (e.g., a host computer, an interface device, a reader, and a printer) or to an apparatus implemented as a single device (e.g., a copier or a facsimile machine). Objects of the present invention may be achieved in such a manner that a recording medium storing program code for implementing the functions of the above-described embodiments is supplied to the system or apparatus, and a computer (CPU or MPU) in the system or apparatus reads out and executes the program code stored in the recording medium. In this case, the program code itself read out from the recording medium implements the functions of the above-described embodiments, and the program code itself and the recording medium storing the program code constitute the present invention.

The present invention covers the case where an Operating System (OS) or the like running on the computer performs part or all of actual processing under instructions of the program code to implement the functions of the above-described embodiments. The present invention is further applied to the case where the program code read out from the recording medium is written to memory provided in a function extension board inserted into the computer or in a function extension unit connected to the computer. In this case, a CPU or the like provided in the function extension board or function extension unit performs part or all of actual processing under instructions of the program code to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-196279, filed on Jul. 18, 2006, which is hereby incorporated by reference herein in its entirety.

What is claimed is:

1. An image processing apparatus, comprising:
   a color determination unit which determines a color of a copy-forgery-inhibited pattern image data;
   a color space determination unit which determines a color space for compressing the copy-forgery-inhibited pattern image data based on the result of determination by the color determination unit;
   a compression unit which compresses the copy-forgery-inhibited pattern image data in the color space determined by the color space determination unit,
   wherein the color space determination unit determines the color space so that a data amount of compressed data after compressing the copy-forgery-inhibited pattern image data by the compression unit decreases; and
   a control unit which stores the copy-forgery-inhibited pattern image data compressed by the compression unit in a storage unit,
   wherein the compression unit compresses the copy-forgery-inhibited pattern image data by lossy compression,
   the color determination unit determines whether a color of the copy-forgery-inhibited pattern image data is black,
   it is determined by the color space determination unit that the color space for compressing the copy-forgery-inhibited pattern image data is YCbCr space when the result of determination by the color determination unit is black,
   it is determined by the color space determination unit that the color space for compressing the copy-forgery-inhibited pattern image data is RGB space when the result of determination by the color determination unit is not black,
   and a processor is configured to function as at least one of the color determination unit, the color space determination unit, the compression unit and the control unit.

2. An image processing method in an image processing apparatus, comprising:
   using a processor to perform;
   a color determination step of determining a copy-forgery-inhibited pattern color of a copy-forgery-inhibited pattern image data;
   a color space determination step of determining a color space for compressing the copy-forgery-inhibited pattern image data based on the result of determination in the color determination step;
   a compression step of compressing the copy-forgery-inhibited pattern image data in the color space determined in the color space determination step,
   wherein the color space is determined in the color space determination step so that a data amount of compressed data after compressing the copy-forgery-inhibited pattern image data in the compression step decreases; and
   a control step of storing the copy-forgery-inhibited pattern image data compressed in the compression step in a storage unit,
   wherein the copy-forgery-inhibited pattern image data is compressed by lossy compression in the compression step,
   it is determined in the color determination step whether a color of the copy-forgery-inhibited pattern in the copy-forgery-inhibited pattern image data is black,
   it is determined in the color space determination step that the color space for compressing the copy-forgery-inhibited pattern image data is YCbCr space when the result of determination in the color determination step is black,
   and it is determined in the color space determination step that the color space for compressing the copy-forgery-inhibited pattern image data is RGB space when the result of determination by the color determination unit is not black.

3. A non-transitory computer readable recording medium on which is recorded a program for making a computer execute each step in the image processing method according to claim 2.

4. An image processing apparatus, comprising:
a copy-forgery-inhibited pattern image data determination unit which determines whether a target image contains a copy-forgery-inhibited pattern image data;
a color determination unit which determines whether a copy-forgery-inhibited pattern color of a copy-forgery-inhibited pattern image data is black when it is determined by the copy-forgery-inhibited pattern image data determination unit that the copy-forgery-inhibited pattern image data is contained within the target image;
a color space determination unit which determines that a color space for compressing the target image is a first color space when it is determined by the copy-forgery-inhibited pattern image data determination unit that the copy-forgery-inhibited pattern image data is not contained within the target image or when it is determined by the color determination unit that the copy-forgery-inhibited pattern color of the copy-forgery-inhibited pattern image data is black, and
which determines that a color space for compressing the target image is a second color space different from the first color space when it is determined by the copy-forgery-inhibited pattern image data determination unit that the copy-forgery-inhibited pattern image data is contained within the target image and when it is determined by the color determination unit that the copy-forgery-inhibited pattern color of the copy-forgery-inhibited pattern image data is not black,
wherein the first color space is YCbCr space and the second color space is RGB space,
and a processor is configured to function as at least one of the copy-forgery-inhibited pattern image data determination unit, the color determination unit, and the color space determination unit.

5. An information processing apparatus capable of communicating with an image processing apparatus, the image processing apparatus comprising:
a copy-forgery-inhibited pattern image data determination unit which determines whether a target image contains a copy-forgery-inhibited pattern image data;
a color determination unit which determines whether a copy-forgery-inhibited pattern color of a copy-forgery-inhibited pattern image data is black when it is determined by the copy-forgery-inhibited pattern image data determination unit that the copy-forgery-inhibited pattern image data is contained within the target image; and
a color space determination unit which determines that a color space for compressing the target image is a first color space when it is determined by the copy-forgery-inhibited pattern image data determination unit that the copy-forgery-inhibited pattern image data is not contained within the target image or when it is determined by the color determination unit that the copy-forgery-inhibited pattern color of the copy-forgery-inhibited pattern image data is black, and
which determines that a color space for compressing the target image is a second color space different from the first color space when it is determined by the copy-forgery-inhibited pattern image data determination unit that the copy-forgery-inhibited pattern image data is contained within the target image and when it is determined by the color determination unit that the copy-forgery-inhibited pattern color of the copy-forgery-inhibited pattern image data is not black,
wherein the information processing apparatus comprises a transmission unit which transmits information to the image processing apparatus so that the color determination unit in the image processing apparatus determines that a color of the copy-forgery-inhibited pattern image data is a copy-forgery-inhibited pattern image data other than black when copy-forgery-inhibited pattern image data is black and copy-forgery-inhibited pattern image data in a color other than black are mixed,
and a processor is configured to function as at least one of the copy-forgery-inhibited pattern image data determination unit, the color determination unit, the color space determination unit, and the transmission unit.

* * * * *